(12) United States Patent
Beste

(10) Patent No.: US 11,492,682 B2
(45) Date of Patent: Nov. 8, 2022

(54) HIGH CARBON CONTENT COBALT-BASED ALLOY

(71) Applicant: VBN COMPONENTS AB, Uppsala (SE)

(72) Inventor: Ulrik Beste, Björklinge (SE)

(73) Assignee: VBN COMPONENTS AB

( * ) Notice: Subject to any disclaimer, the term of this patent is extended or adjusted under 35 U.S.C. 154(b) by 393 days.

(21) Appl. No.: 16/494,194

(22) PCT Filed: Mar. 14, 2018

(86) PCT No.: PCT/SE2018/050251
§ 371 (c)(1),
(2) Date: Sep. 13, 2019

(87) PCT Pub. No.: WO2018/169477
PCT Pub. Date: Sep. 20, 2018

(65) Prior Publication Data
US 2020/0087755 A1    Mar. 19, 2020

(30) Foreign Application Priority Data

Mar. 14, 2017 (SE) .................................. 1750298-0
Mar. 14, 2017 (SE) .................................. 1750299-8
Mar. 14, 2017 (SE) .................................. 1750300-4

(51) Int. Cl.
*B32B 15/00* (2006.01)
*C22C 19/07* (2006.01)
(Continued)

(52) U.S. Cl.
CPC ............... *C22C 19/07* (2013.01); *B22F 1/05* (2022.01); *B22F 1/065* (2022.01);
(Continued)

(58) Field of Classification Search
None
See application file for complete search history.

(56) References Cited

U.S. PATENT DOCUMENTS 2,048,707 A * 7/1936 Pfanstichl ............... C22C 27/06
15/445
3,421,890 A * 1/1969 Baumel ................... C22C 27/06
428/668
(Continued)

FOREIGN PATENT DOCUMENTS

CN    102876907 B    1/2013
CN    102876907       2/2014
(Continued)

OTHER PUBLICATIONS

Examination Report (first) for India application No. 201917036528, dated Oct. 27, 2021, 6 pages.
(Continued)

*Primary Examiner* — Seth Dumbris
(74) *Attorney, Agent, or Firm* — Adsero IP

(57) ABSTRACT

The present invention relates to a 3D-printed cobalt-based alloy product comprising carbon, tungsten and chromium with very good mechanical and thermal properties as well as a method of preparing the 3D-printed product and a powder alloy. The alloy has a high carbon content leading to high carbide content but small and evenly distributed carbides. A method facilitating 3D printing of high carbide content alloys such as the present alloy is also disclosed.

21 Claims, 26 Drawing Sheets

(51) Int. Cl.
- *B33Y 10/00* (2015.01)
- *B33Y 70/00* (2020.01)
- *B23K 15/00* (2006.01)
- *C22C 30/00* (2006.01)
- *C22C 32/00* (2006.01)
- *B22F 1/05* (2022.01)
- *B22F 1/065* (2022.01)
- *B33Y 30/00* (2015.01)
- *B33Y 80/00* (2015.01)

(52) U.S. Cl.
CPC ......... *B23K 15/0086* (2013.01); *B33Y 10/00* (2014.12); *B33Y 70/00* (2014.12); *C22C 30/00* (2013.01); *C22C 32/0052* (2013.01); *B22F 2301/15* (2013.01); *B33Y 30/00* (2014.12); *B33Y 80/00* (2014.12)

(56) References Cited

U.S. PATENT DOCUMENTS

| | | | |
|---|---|---|---|
| 3,746,518 A | | 7/1973 | Holtz et al. |
| 4,131,450 A | * | 12/1978 | Saito ..................... B22F 9/22 |
| | | | 420/439 |
| 4,297,135 A | | 10/1981 | Giessen et al. |
| 9,803,263 B2 | * | 10/2017 | Berglund ............ C22C 32/0052 |
| 2010/0291401 A1 | | 11/2010 | Medina et al. |
| 2016/0002982 A1 | | 1/2016 | Mukhopadhyay et al. |
| 2016/0332236 A1 | * | 11/2016 | Stoyanov ................ B22F 10/20 |

FOREIGN PATENT DOCUMENTS

| | | |
|---|---|---|
| DE | 102013210895 | 12/2014 |
| EP | 2361704 | 8/2011 |
| EP | 3050647 | 10/2018 |
| FR | 1470129 | 2/1966 |
| GB | 471495 | 8/1937 |
| WO | WO 2009/146381 | 12/2009 |
| WO | WO 2014/041027 | 3/2014 |
| WO | WO 2014/150323 | 9/2014 |
| WO | WO 2015/165934 | 11/2015 |

OTHER PUBLICATIONS

International Search Report for PCT/SE2018/050251, dated May 17, 2018, 3 pages.

Yakovlev et al. (2005) Surface & Coatings Tech. 190:15-24, "Laser-assisted direct manufacturing of functionally graded 3D objects".

* cited by examiner

| Alloy | Ref. | C wt% | Cr wt% | W wt% | Mn wt% | Fe wt% | B wt% | Si wt% | Ni wt% | Co wt% | Others wt% | Type | Specified Hardness [HRC] |
|---|---|---|---|---|---|---|---|---|---|---|---|---|---|
| Stellite F | i) | 2 | 25 | 12 | 0.3 | 1 | | 1 | 22 | Bal | | Cast | 40-45 |
| Stellite Alloy Star J | i) | 2.2-2.8 | 31-34 | 16-19 | <2 | <3 | | 0.8-2 | <2.5 | Bal | | Cast (old) | 55 |
| Stellite Alloy Star J-metal PM | i) | 2.2-2.7 | 31-34 | 16-19 | <1 | <3 | <1 | <1 | <2.5 | Bal | | Powder (today) | 60 |
| Stellite Star J | xv) | 2.5 | 32,5 | 17,7 | 1,0 | <3 | <1 | 1.0 | 3.0 | Bal | | P/M Alloy | 53-60 vii) |
| Stellite 2400 | i) | 2.3 | 31.3 | 17.5 | 0.7 | 4.2 | 0.2 | 0.5 | | Bal | V=2.4. Mo=0.3 | Cast | N/A |
| Stellite 1 | vi) | 2.45 | 32 | 12 | | <3.0 | | <2.0 | <3.0 | Bal | Mo<1.0 | Welding rod | 51-56 |
| Stellite 20 | vi) | 2.45 | 33 | 16 | | <3.0 | | <2.0 | <3.0 | Bal | Mo<1.0 | Welding rod | 53-59 |
| Stellite 1 | v) | 2.5 | 32 | 13 | 1 | 2.5 | | 1 | 2.5 | Bal | | Cast | N/A |
| Stellite 2 | v) | 2.5 | 31 | 13 | 1 | 2.5 | | 1 | 2.5 | Bal | | Cast | N/A |
| Stellite 20 | v) | 2.5 | 32 | 17 | 0.5 | 2.5 | | 1 | 2.5 | Bal | | Cast | N/A |
| JK575 | vi) | 2.5 | 30 | 12 | | | | | | Bal | | HVOF Powder | N/A |
| Stellite 20 | vi) | 2.55 | 32.5 | 17.5 | | <2.0 | | <1.0 | <2.0 | Bal | Mo<1.0 | PTA Powder | 52-62 |
| MicroMelt 1 | viii) | 2.8 | 31.5 | 13.5 | 0.5 | 1.5 | | 1.0 | 1.5 | | Mo=0.5 | PTA powder | 50-52 |
| Stellite 190 | vi) | 3.2 | 27 | 13.5 | | <3.0 | | 1.0 | <1.0 | Bal | Mo<1.0 | Welding rod | N/A |
| Stellite 190 PM | iii) | 3.2 | 26 | 14 | 1 | 5 | 1 | 1 | 3 | Bal | | Cast | 30 |
| Stellite 190 | iii) | 3.25 | 26 | 14.5 | 0.5 | 3 | | 0.85 | 3 | Bal | | Cast | 30 |
| Stellite 190 | ii) | 3.3 | 27 | 14 | | <3 | | | | Bal | Ni, Si, Mo, Mn | Powder, Welding rod | 52-60 |
| Stellite 190 | vi) | 3.4 | 26 | | | <2.0 | | <1.0 | <2.0 | Bal | Mo<1.0 | PTA Powder | 55-60 |
| Stellite 720 | xxii) | 2.5 | 33 | | <1,5 | <3 | | <1,5 | <3 | Bal | 18 Mo | Cast, PTA weld alloy | 53-60 |

Fig. 1.

| Alloy | Ref. | C wt% | Cr wt% | W wt% | Mn wt% | Fe wt% | Ta or Cb wt% | Si wt% | Ni wt% | Mo wt% | Nb wt% | Others | Specified hardness [HRC] |
|---|---|---|---|---|---|---|---|---|---|---|---|---|---|
| Tantung G | iv) | 2-4 | 27-32 | 14-19 | 1-3 | 2-5 | 2-7 | | | | | | 60-63 |
| Tantung 144 | iv) | 2-4 | 25-30 | 16-21 | 1-3 | 2-5 | 3-8 | | | | | | 61-65 |
| Rexalloy 33 | ix) | 2.25 | 33 | 18 | | | | | | | | Not discl. | 63 |
| DO-ALLOY D-7002 | i) | 2 | 30 | | | | | | | | | | Not discl. |
| Stellite Star J | xv) | 2.5 | 32.5 | 17.5 | 1 | 3.0 | | 1 | 3 | | | B 1wt% | 53-60 |
| Stellite 98M2 | xv) | 2 | 30 | 18.5 | 1 | 5 | | 1 | 3.5 | 0.8 | | B 1wt% | 66 |
| Stellite 2400 39V | i) | 2.3 | 31 | 17.5 | 0.7 | 4.2 | | 0.5 | | 0.3 | | V 2.4wt%, B 0.2wt% | Not discl. |
| Crobalt | i) | Not discl. | 25-30 | 14-20 | | | | | | | | | 62 (xiii) |

Fig. 2.

| Alloy | C (wt%) | Cr (wt%) | W (wt%) | Mn (wt%) | Fe (wt%) | Ta (wt%) | Si (wt%) | Ni (wt%) | Mo (wt%) | Nb (wt%) | Meas. hard. [HV 2kg] | Sum of meas. crack length. [μm] |
|---|---|---|---|---|---|---|---|---|---|---|---|---|
| Tantung, Freeborn wood cutter tool | 2.19 | 28.6 | 16.9 | 1.57 | 0.95 | <0.05 | <0.1 | 0.25 | | 2.6 | 625 | 8 |
| Tantung G VR/Wesson | 2.18 | 29.6 | 16.6 | 1.4 | 2.6 | 0.09 | | 0.24 | | 2.6 | 727 | 19 |
| Tantung G VR/Wesson | 2.45 | 29.2 | 15.8 | 1.7 | 1.4 | 0.11 | | 0.22 | | 2.6 | 758 | 43 |
| Tantung G VR/Wesson | 2.04 | 32.7 | 19.3 | 0.75 | 0.64 | 0.12 | | 0.26 | | 2.6 | 768 | 0 |
| Tantung 144 VR/Wesson | 2.28 | 28.1 | 17.8 | 1.6 | 1.7 | 0.07 | 0.11 | 0.22 | <0.01 | 2.7 | 808 | N/A |
| Tantung 144 VR/Wesson | 2.34 | 27.5 | 17.9 | 1.6 | 1.7 | 0.06 | 0.11 | 0.23 | <0.01 | 2.6 | 862 | N/A |
| Rexalloy 33 | 2.01 | 31.4 | 19.2 | 0.81 | 0.5 | 0.07 | | 0.48 | | 0.01 | 780 | 0 |
| DO-Alloy D-7002 | 2.35 | 29.4 | 15.7 | 1.7 | 1.3 | 0.11 | | 0.21 | | 2.4 | 755 | 0 |
| Stellite J | 2.38 | 33.7 | 18.3 | 0.82 | 1.2 | <0.03 | 0.11 | 0.24 | 0.1 | 0.01 | 796 | N/A |
| Stellite Star J | 1.6 | 34.5 | 17.6 | 0.52 | 0.96 | 0.09 | 0.5 | 0.34 | | 0.01 | 772 | 114 |
| Stellite 98M2 | 2.03 | 31.7 | 19 | <0.08 | 1.6 | 0.07 | 0.2 | 3.8 | 0.6 | 0.01 | 855 | 140 |
| Stellite R98M2 | 2.05 | 33 | 18.9 | <0.08 | 1.6 | 0.07 | | 3.9 | | 0.01 | 845 | 181 |
| Stellite 2400 39V | 2.32 | 33.1 | 17.8 | 0.4 | 0.8 | 0.06 | 0.3 | 0.2 | 0.9 | 0.03 | 703 | 35 |
| Blackalloy 525 | 2.26 | 27.3 | 17.9 | 1.5 | 1.8 | 0.11 | | 0.31 | | 2.6 | 818 | N/A |
| Crobalt | 1.21 | 29.2 | 16.7 | 1.8 | 1.2 | <0.03 | 0.3 | 1.7 | <0.1 | 2.8 | 661 | 22 |

Fig. 5

HIGH CARBON CONTENT COBALT-BASED ALLOY

CROSS-REFERENCE TO RELATED APPLICATION

This application claims priority to and is a 35 U.S.C. § 371 national phase application of PCT/SE2018/050251 (WO2018/169477), filed on Mar. 14, 2018 entitled "HIGH CARBON CONTENT COBALT-BASED ALLOY", which application claims priority to and the benefit of Sweden Patent Application Nos. 1750298-0, filed Mar. 14, 2017, 1750299-8, filed Mar. 14, 2017 and 1750300-4, filed Mar. 14, 2017, the disclosures of which are incorporated herein by reference in their entirety.

FIELD OF THE INVENTION

The present invention relates to cobalt-based alloys, a 3D-printed product comprising one or more of said alloys and a method of preparing a 3D-printed product comprising one or more of said alloys.

BACKGROUND

Material Processing Techniques

There are today a number of different manufacturing methods for obtaining high alloyed materials with high carbon content. All the methods have advantages and disadvantages, and the choice is dependent on conflicting demands when it comes to quality and cost.

A common method is casting followed by forging/rolling of an ingot (a.k.a. wrought alloys). The desired alloy material is melted in a furnace and solidified in ingots. These ingots are then forged and rolled into bars of material which can have many different shapes and sizes. The advantage of this method is that it is a well-proven technology and it gives the possibility to produce materials with very high purities. There are numerous metallurgical technologies for improving the purity of metals. These include ladle treatments with or without vacuum treatment, ESR (Electro Slag Remelting), VIM/VAR, etc. De-oxidation of high carbon alloys can also be performed by exposing the molten alloy to vacuum. The carbon will then react with the oxygen and form carbon monoxide gas that can be removed by the vacuum pump.

"High purity" in these materials is usually synonymous with "low oxygen content" since in general the presence of oxygen results in oxide impurities which result in impaired properties of the material.

A major disadvantage with the common casting-ingot-technique is the long solidification times, resulting in coarse microstructures and solidification patterns. This is particularly the case for highly alloyed materials with high carbon content. With a long solidification time, the carbides will form carbide structures which significantly reduce the mechanical properties of the material. A long solidification time will also result in a coarse microstructure in general, which also give impaired material properties. Another disadvantage is the need of subsequent forging and forming of the ingot to a metal bar (which typically is the end product in the material-processing plant). Forging and rolling are complex processes that require a number of heating and forming steps of the material ingot with resultant high energy losses. Highly alloyed materials are typically very difficult to form, and therefore require very high temperatures and high loads, which could result in cracked ingots, as well as high process costs. In other words, the fact that it must be possible to forge and/or to roll alloys made using this process limits the possibility of high alloying.

To overcome the problems caused by coarse microstructures it is possible to use Powder Metallurgy (PM). By first granulating ("atomizing") the desired molten alloy into a metal powder, a very fine microstructure can be achieved in the powder, due to the very quick solidification caused either by the atomization gas or other granulating techniques. The metal powder from gas atomization is formed typically of spherical shape with smaller powder particles stuck on the surface of the larger powder particles; "satellites". This metal powder can be put into capsules—metal sheet containers which can be cylindrical or near-net-shape. The containers can then be sealed and compacted by HIP (hot isostatic pressing), which is a common and well-known method. The result of the HIP is a fine structured metal bar (or near-net-shape component). One disadvantage is that the surface oxygen on every powder particle will give a higher oxygen content compared to a solidified large ingot as the oxygen accumulates on all the powder particles in the atomizing process. For PM-HIP of near-net-shape components, the need for capsule limits how complex a component can be.

An important limitation of the PM-HIP process is the difficulty of atomizing the powder. The atomization process typically requires a tap hole in the crucible which does not get clogged by the melt. Here, high melting temperatures and strong carbide formers limit the possibility to get a continuous industrial atomization process for larger batches. In addition, high melting temperature are expensive to achieve and difficult to handle in an industrial scale in the melting furnace (crucibles). The limit is typically set by the furnace lining—an advanced lining of zirconia can withstand a maximum temperature of approx. 1900° C. and a more conventional lining of alumina can withstand a maximum temperature of approx. 1750° C. When melting a material there is also almost always a need for a higher temperature than the actual melting point, so-called "superheat". The superheat ("over temperature") is needed to overcome temperature losses in the furnace so that the metal does not freeze in the tap hole and also to increase the melt flowability in the furnace, in order to be able to tap it. This superheat is typically set to around 150° C. in an industrial system. Based on this, the maximum melting point of an alloy which it is possible to gas granulate today is about 1600° C. with normal crucibles and up to 1750° C. using more advanced ones.

For highly alloyed materials with high carbon content, the PM-HIP process typically is performed in quite large and uniform containers. But the resulting material still needs to be wrought by heating, forging and rolling to become a metal bar with the required dimensions. This is typically difficult for highly alloyed materials and, if even if it is possible, the resulting yield is sometimes low. Again, the need to be able to forge and/or roll the material limits the possibility for high alloying.

Forming a component from a PM-HIP material requires machining (turning, drilling, milling, etc.), in other words many additional process steps. Another problem with highly alloyed materials is that they also are difficult and expensive to machine and a lot of the expensive highly alloyed material is wasted during machining. The higher the wear resistance and hardness of an alloy, the more difficult it is to machine. The group of CoCr alloys is well known to be very difficult to machine and the hard, high carbon grades are almost only possible to shape by grinding.

It is also possible to directly cast a molten material into a mold, so that the final shape of a component is nearly set when the cast has solidified. The disadvantages with casting are the formation of a coarse microstructure and solidification patterns due to long solidification times and the anisotropy in the component due to different solidification times at different sections. Furthermore, casting methods require a mold which sets the limit for how complex a component can be.

For cast high carbon cobalt-based alloys there is a limit in size and in shape complexity. The reason is that to be able to achieve a fine microstructure the cast must be cooled quickly in a permanent refractory mold (typically graphite). Therefore, the size limit is typically in size range of solid tool bits, such as 1×1×6 inch (2.5×2.5×16 cm), or smaller cut-off blades. In addition, the potential complexity of a desired component must be heavily reduced due to the need for quick and uniform cooling speed, and the brittleness of the material. Despite all these efforts, often the cooling rates are not fast enough to reduce the chromium carbide sizes.

Another manufacturing method is to use metal powder, combine it with a binder of suitable kind, press the powder-binder-mix to a shape, and then sinter it. Sintering is usually performed by one of two methods: heating to remove binder and to get a diffusion coupling of the metal powders, or to get the metal powder partly melted and by that unified into a metal (liquid sintering). The major advantage with sintering methods is the possibility to unify materials with high melting points (typically cemented carbides or other pure ceramic materials). One type of sintering method is Metal Injection Molding (MIM), where a feedstock consisting of metal powders and a binder is pressed to a "green body" similar to plastic injection molding, and then the green body is sintered separately into the final component (which usually comprises pores).

The major disadvantages are: the size of the component changes during binder removal and diffusion, the need for compaction methods (pressing tools), the need of a binder and the removal of the binder (purity issues), limitations on the thickness or size of the product and porosity problems. For example, cemented carbides are compacted 20% in the x-y-z-directions during sintering. This large reduction in size during sintering and the resulting tolerance issues, and the constraints in component size, cause major problems. This is a result of the need for a uniform compaction of powder and binder, and the need for the removal of the binder throughout the full material thickness. For example, sintered metal-injection-molding (MIM) products are reported to have a limit in wall thickness of a maximum of 30 mm and maximum weight of parts produced is 800 g.

A typical method for consolidating materials that are difficult to melt is to sinter them. To sinter a metal powder, some kind of pre-packing is needed, and by heating to approximately half the melting temperature the powder particles will bond together. The result is typically a material structure with porosity and inhomogeneity. A similar method is liquid phase sintering, in which a small amount of the mixed powders coexists as a liquid during the sintering process. The liquid phase sintering results in a much better bonding of the powders. The most common liquid phase sintering materials are WC—Co cemented carbides. However, the sintering techniques require some kind of pre-consolidation of a metal powder mixture and a binder/pressing. This type of mixture is achieved by mixing and milling WC with Co and a binder, the latter typically polyethylene glycol (PEG) or some other kind of binder which can, by heating, be reduced to carbon, oxygen and hydrogen for removal from the material in the sintering furnace.

Another method to overcome the difficulties with a coarse microstructure in a highly alloyed material with high carbon content, and to avoid the need for machining of these difficult-to-machine materials, is to use additive manufacturing (AM, 3D-printing or free forming) methods. In AM, the highly alloyed metal powder is directly melted and solidified in the AM processing machine. A large number of different AM technologies exist but for metals the most common technique is metal powder bed melting. In this technique a metal powder is spread out and melted, by a laser or an electron beam, layer by layer, in a pattern based on a CAD drawing of the final product sliced into layers. The benefits are fine microstructure, complex shapes and high material yield. However, AM process needs powders that can be granulated, and this is not possible on an industrial scale for every alloy composition. High carbon materials tend to crack when used in additive manufacturing processes where the materials are melted layer by layer and special care has to be taken to achieve a successful run.

Still prior art have not shown 3D printing of steels or other alloys with high carbon or carbide content and high tungsten content.

Prior Art Materials

Cobalt chromium alloys are resistant to corrosion due to the formation of a protective layer, exhibit good mechanical properties, good wear resistance and are also biocompatible. One of the special features of these CoCr-alloys is their high heat resistance (a.k.a. "red temperature"). This makes it possible to use Co-based alloys at higher temperatures than, for example, high speed steels (HSS) that soften at approximately 560° C.

One type of CoCr-alloys is the group of Stellite® materials. The Stellite® alloys are typically wear resistant and hard, resulting in very good properties for heavy wear applications.

The alloys named "Stellites" were invented in USA in the early 1900s and are a group of Co—Cr materials with high amounts of W, Mo and other elements. These alloys present a combination of wear resistance and corrosion resistance, and they have been demonstrated in many years to work very well in knifes, cutting tools, wear parts and valves etc. These alloys typically are placed between high-speed steels (HSS) and cemented carbides (CC) in properties such as wear and heat resistance.

In general, the higher the carbon content, the more carbides in the material, the more wear resistance is achieved. The big problem is that these types of materials are very difficult, or even impossible, to machine. Therefore, these materials are only cast as small parts or, most commonly, used as a coating or welding material. In this way, it is possible to avoid long and different solidification times which results in coarse carbide formation and a non-uniform microstructure.

So, generally, the Stellites and other CoCr alloys with the highest carbon content on the market are mainly provided as powders for thermal spraying, laser cladding or welding rods. In thermal spraying molten material is sprayed onto a surface/substrate and the melting is performed by an arc or plasma or combustion flame. There are a number of varieties of cladding methods with different material feeds, but the most common uses metal powder which is fed into a pool of laser-melted alloy, where typically a thin (0.05-2 mm) layer of a rapidly melted and solidified material is formed upon a moving substrate. The laser cladding method has the benefit of using less energy than the thermal spray methods and thus the grain structure become finer. However, very quick solidifying upon a cold substrate leads to large stresses and therefore the range of materials that could be used in such coating is limited. Coating of a substrate with different compositions also lead to dilution of the cladding layer. Other typical limitations in cladding methods are the lack of control of the ongoing cladding process. When the surface of a tough substrate is clad, then the need for high toughness in the cladding layer is usually lower since it is supported by the tough substrate, and therefore the toughness of cladding alloys could be lower than if you build a larger component as in the present invention.

It is possible to use a high carbon cobalt chrome alloy powder for consolidation in the HIP, but it is only possible to produce small parts with limited mechanical properties. For example, Stellite 190 PM is specifically said to not be designed to be a casting alloy. For components that are small or of simple geometry requiring extreme abrasion resistance and are not subject to severe mechanical shock, HIP-consolidated parts can be manufactured.

Some components that during use are heated need to be cooled during use. In order to cool the components they may have cooling channels through which cooling media may flow. However there is a major risk that the component cracks during cooling due to the low fracture toughness. There is therefore a large gap in the prior art between the need for CoCr-materials with high C content with excellent mechanical and thermal properties and the existing alloy compositions and manufacturing methods. The present patent application suggests a solution to this.

Today, there exist some new types of wear resistant CoCr-alloys and in general these types of alloys relate to compositions where the carbon content has been minimized and instead the intermetallic laves phase appear, an example is called "Tribaloy".

These types of Co-based alloys can be alloyed with a number of elements. In general, iron, manganese, nickel and carbon tend to stabilize the fcc (face cubic centre) structure and increase the stacking fault energy of the matrix, and chromium, molybdenum, tungsten, and silicon stabilize the hcp (hexagonal close-packing) structure and decrease the stacking fault energy.

Stellites and similar known Co alloys with the highest carbon content (approx.>2 wt % (% by weight)) are presented in FIG. 1.

EP2361704 discloses a method of free forming an alloy having a Carbon content of up to 3.5 wt % and wherein the alloy has low oxygen content. However, this patent fails to disclose an alloy or a 3D printed product with both high carbon and tungsten content.

SUMMARY OF THE INVENTION

The object of the present invention is to overcome the drawbacks of the prior art and provide a 3D-printed product based on a cobalt-based alloy, a cobalt-based alloy and a method of preparing the 3D-printed product comprising one or more of these alloys. The present invention provides new alloys, a new 3D-printing method and a new 3D-printed product comprising a cobalt-based alloy with Cr, W and C content so that large Cr carbides can be avoided, which in turn increases the hardness and toughness of the material at high temperature. The toughness is increased both in the sense of crack initiation but also when it comes to crack propagation. Additionally the present invention provides a product that has a very fine microstructure with small, round evenly distributed carbides which provides improved fatigue properties as well as improved resistance to thermal chock. The mechanical properties of the material are more dependent on the maximum carbide size than the average carbide size since any fracture is most likely to occur at the site of the largest carbide. This application reveals a unique combination of alloying elements to facilitate the powder granulation of these alloys which is necessary for additive manufacturing. The present invention overcomes the drawbacks of reduced size and porosity seen in sintered materials and the drawbacks of complexity limitations seen for cast and near-net-shaped PM-HIP products.

The present inventors use an alloy which facilitates large scale production of pre-alloyed powder using gas atomization since the melting point is low enough and the alloy does not contain any exotic difficult-to-get elements. In addition, a coarser powder size fraction than typically used in 3D-printing has been used.

The complex balance of different carbide formations, matrix solid solutions (especially of W), melting and solidification ranges are very difficult to handle, but the present patent invention solves this by adapting a unique combination of elements in combination with the present method.

In a first aspect the present invention relates to 3D-printed product made of an alloy comprising a metal matrix and grains of carbides embedded in the metal matrix;
wherein the alloy comprises
Carbon: equal to or greater than 2.5 and equal to or less than 5 weight %,
Tungsten: equal to or greater than 12 and equal to or less than 30 weight %,
Chromium: equal to or greater than 12 and equal to or less than 27 weight %
Cobalt: equal to or greater than 30 weight %; and
wherein the alloy has a melting point of less than 1750° C., or preferably less than 1600° C., but higher than 1300° C.

In a second aspect the present invention relates to a 3D-printed product made of an alloy comprising a metal matrix and grains of carbides embedded in the metal matrix;
wherein the alloy comprises
Carbon: equal to or greater than 3.1 and equal to or less than 5.1 weight %,
Tungsten: equal to or greater than 18 and equal to or less than 30 weight %,
Chromium: equal to or greater than 15 and equal to or less than 24 weight %
Cobalt: equal to or greater than 40 weight %;
wherein the sum of the chromium and tungsten is 36 to 48 wt %; and
wherein the alloy has a melting point of less than 1750° C., or preferably less than 1600° C., but higher than 1300° C.

In a third aspect the present invention relates to a method of preparing the 3D-printed product according to the present invention in a free forming apparatus having a chamber comprising:
a. forming a layer of a powder of a cobalt based alloy in an oxygen-low environment in the chamber wherein the alloy comprises:
carbon: equal to or greater than 2.5 and equal to or less than 5 weight %,
tungsten: equal to or greater than 12 and equal to or less than 30 weight %,
chromium: equal to or greater than 12 and equal to or less than 27 weight %
cobalt: equal to or greater than 30 weight %; and wherein the alloy has a melting point of less than 1750° C. or preferably less than 1600° C., but higher than 1300° C.;

wherein the powder comprises substantially spherical particles and/or substantially spherical particles with satellites and wherein the particles have a mean size of below 200 μm b. heating the powder layer to a temperature higher than 300° C.;

c. melting the powder locally by exposing the powder to an energy beam during a sufficient period of time to form a melt pool; and d. letting the melted powder in the melt pool solidify into a multiphase cobalt alloy;

e. optionally preparing an additional layer of powder on top of the previous layer by repeating the steps a-e wherein step b comprises placing the powder on top of the previous layer;

and wherein the product being built is kept heated above 300° C. during the method.

In a fourth aspect the present invention relates to a method of preparing the 3D printed product according to the present invention in a free forming apparatus having a chamber comprising:

a. forming a layer of a powder of a cobalt based alloy in an oxygen-low environment in the chamber wherein the alloy comprises:

Carbon: equal to or greater than 3.1 and equal to or less than 5.1 weight %,

Tungsten: equal to or greater than 18 and equal to or less than 30 weight %,

Chromium: equal to or greater than 15 and equal to or less than 24 weight %

Cobalt: equal to or greater than 40 weight %;

wherein the sum of the chromium and tungsten is 36 to 48 wt %; and wherein the alloy has a melting point of less than 1750° C. or preferably less than 1600° C., but higher than 1300° C.;

wherein the powder comprises substantially spherical particles and/or substantially spherical particles with satellites and wherein the particles have a mean size of below 200 μm b. heating the powder layer to a temperature higher than 600° C.;

c. melting the powder locally by exposing the powder to an energy beam during a sufficient period of time to form a melt pool; and d. letting the melted powder in the melt pool solidify into a multiphase cobalt alloy;

e. optionally preparing an additional layer of powder on top of the previous layer by repeating the steps a-e wherein step b comprises placing the powder on top of the previous layer;

and wherein the product being built is kept heated above 600° C. during the method.

In a fifth aspect the present invention relates to a cobalt-based alloy powder comprising a metal matrix and carbides grains (or particles) embedded in the metal matrix; and wherein the alloy comprises carbon: equal to or greater than 2.5 and equal to or less than 5 weight %, tungsten: equal to or greater than 12 and equal to or less than 30 weight %, chromium: equal to or greater than 12 and equal to or less than 27 weight %, cobalt: at least 30 weight %;

wherein the alloy has a melting point of less than 1750° C. or preferably less than 1600° C., but higher than 1300° C., wherein the alloy powder comprises substantially spherical particles and/or substantially spherical particles with satellites and wherein the particles have a mean size of below 200 μm.

In a sixth aspect the present invention relates a cobalt-based alloy powder comprising a metal matrix and carbides grains (or particles) embedded in the metal matrix; and wherein the alloy comprises Carbon: equal to or greater than 3.1 and equal to or less than 5.1 weight %, Tungsten: equal to or greater than 18 and equal to or less than 30 weight %, Chromium: equal to or greater than 15 and equal to or less than 24 weight %

Cobalt: equal to or greater than 40 weight %;

wherein the sum of the chromium and tungsten is 36 to 48 wt %;

wherein the alloy has a theoretical melting point of less than 1750° C. or preferably less than 1600° C., but higher than 1300° C., wherein the alloy powder comprises substantially spherical particles and/or substantially spherical particles with satellites and wherein the particles have a mean size of below 200 μm.

All the embodiments described herein are applicable to all the aspects of the present invention unless stated otherwise.

BRIEF DESCRIPTION OF THE FIGURES

FIG. 1, Stellites and Co alloys with high carbon content (~2 wt % and higher) of different commercially available alloys (cast, PTA powder, welding rods) from specifications and literature. All composition elements are in wt %.

FIG. 2, cast high carbon Co-based alloys with specified composition (wt %) and hardness from different commercially available alloys. These alloys have been analyzed and the results are presented in FIG. 5.

FIG. 5, Analyzed cast high carbon Co-based alloys with measured composition (wt %), hardness and crack length. The composition is measured by combustion analysis at a certified laboratory and the hardness is measured by a Vickers indenter, 2 kg load, on polished cross section surfaces and presented as an average of 5 indents also at a certified laboratory. The crack length is measured by indenting a 250 kg Vickers tip, loading for 10 seconds, measuring the crack formed in each corner of the indent and calculating the sum of crack lengths. The indentation is performed 3 times and the average of the sums of the crack lengths is presented.

[Sample was 1 μm diamond polished in 5 min and then polished used Struers OP-S technique 40 μm SiO2, pH 9.8 in 10 min, seen in FEG-SEM].

Figure 22:
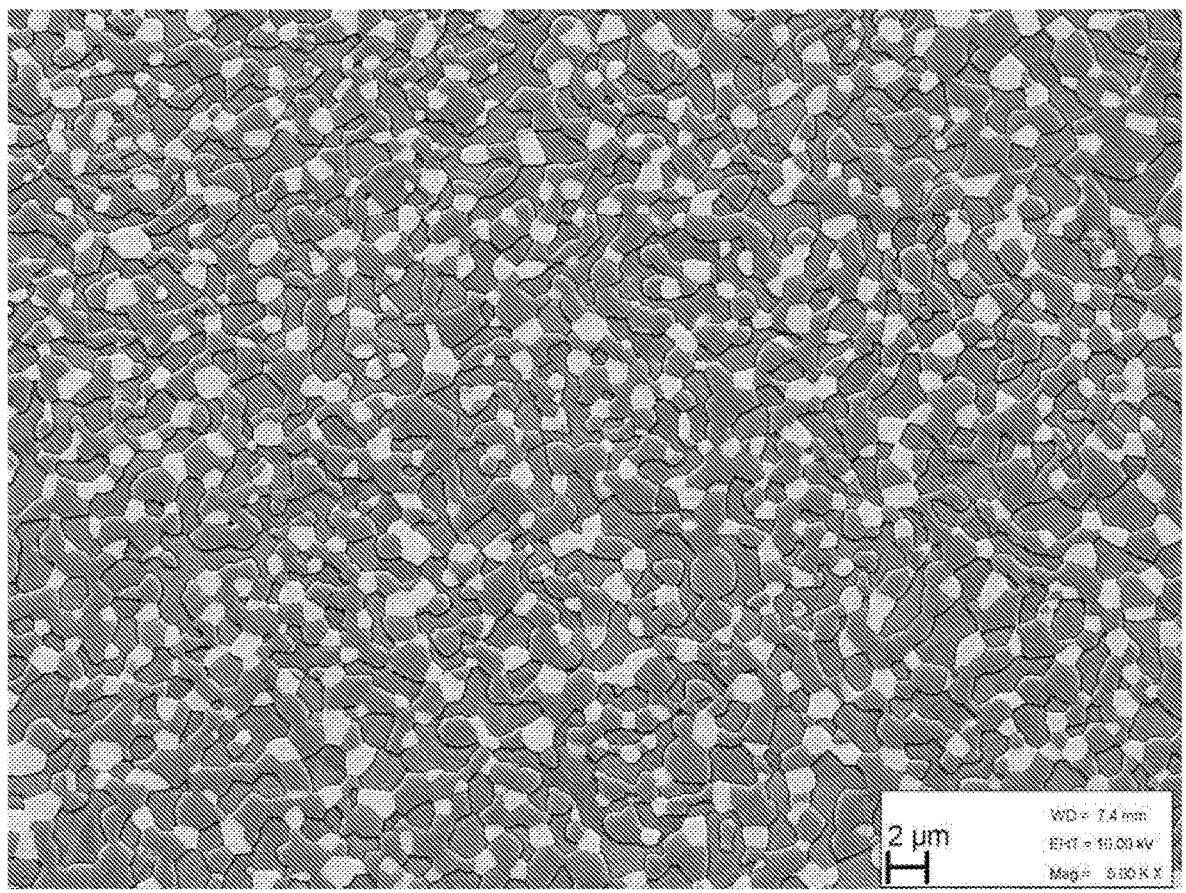

FIG. 22 SEM picture of 3D printed alloy according to the present invention. The combination of new method of 3D-printing and lower Cr-content and higher W-content has resulted in a very fine microstructure without larger carbide stringers. In the figure, white W-rich carbides and grey Cr-rich carbides can be seen, surrounded by the CoCr-matrix. Actual hardness of this sample=873 HV2 kg. [Sample was 1 μm diamond polished in 5 min and then polished used Struers OP-S technique 40 μm SiO2, pH 9.8 in 10 min, seen in FEG-SEM].

Figure 23:
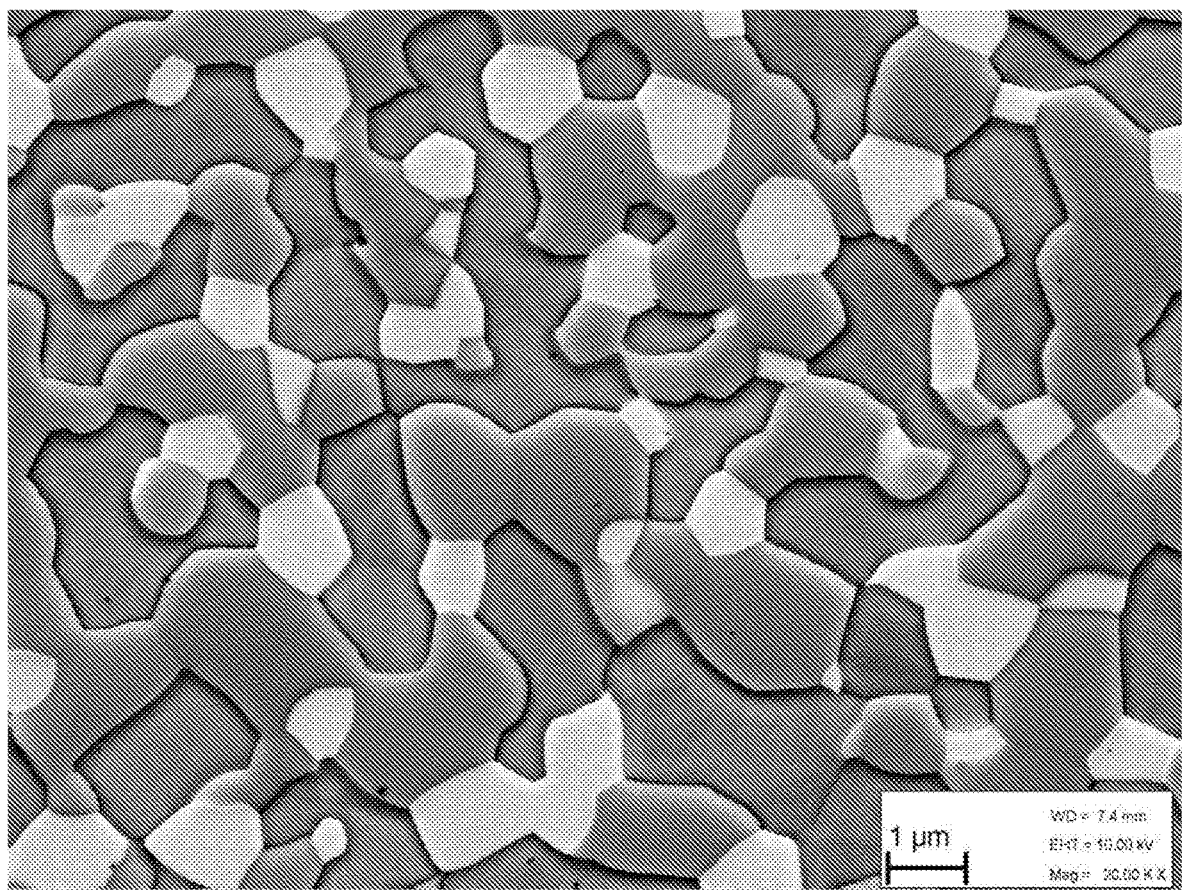

FIG. 23 SEM picture of 3D printed alloy according to the present invention. In this higher magnification, it is possible to see that the carbide size is very small in the range of 1-2 μm. The white carbides are W-rich, the grey carbides are Cr-rich, and the surrounding matrix is CoCr and unavoidable traces from surrounding elements. Actual hardness of this sample=873 HV2 kg. The largest carbide seen here span about 2.5 μm from edge to edge (white arrow). [Sample was 1 μm diamond polished in 5 min and then polished used Struers OP-S technique 40 μm SiO2, pH 9.8 in 10 min, seen in FEG-SEM].

Figure 24:
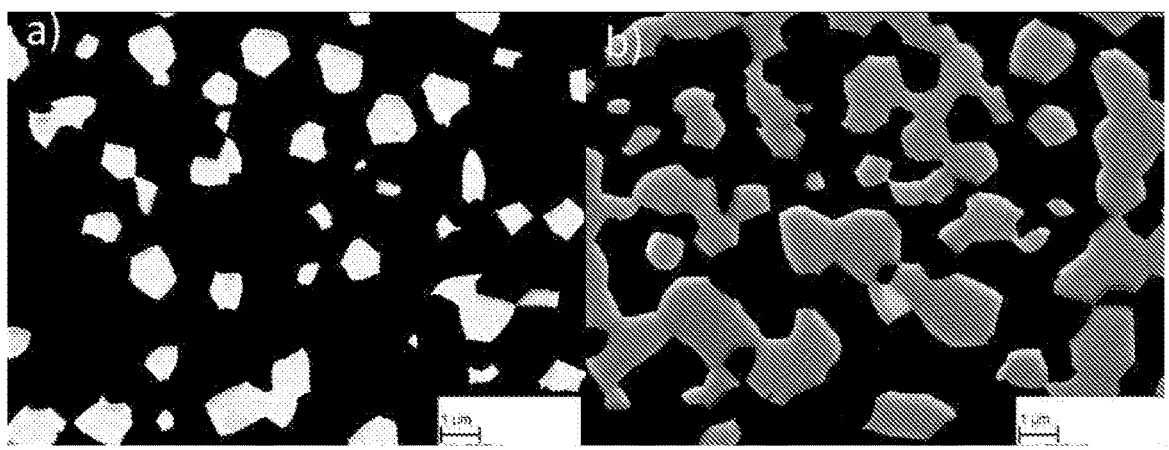

FIG. 24 Same image as in FIG. 23, product according to the present invention with the two different carbides highlighted: a) W-rich carbides (white) and b) Cr-rich carbides (grey).

Figure 25:
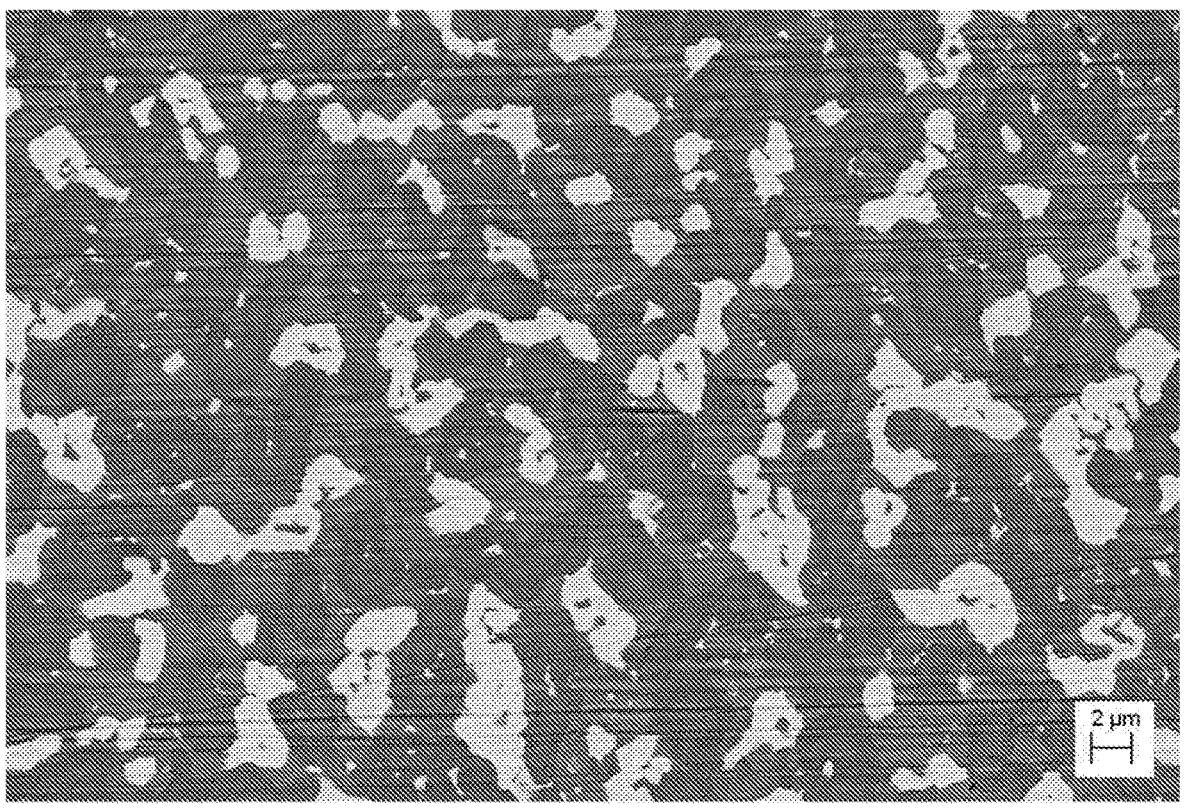

FIG. 25 SEM picture of 3D printed alloy according to the present invention. The white carbides are W-rich and the dark grey carbides is Cr-rich, and the surrounding matrix is CoCr with traces from W. (Some grinding traces is also seen.) [Sample was 1 μm diamond polished in 5 min, seen in FEG-SEM].

Figure 26:
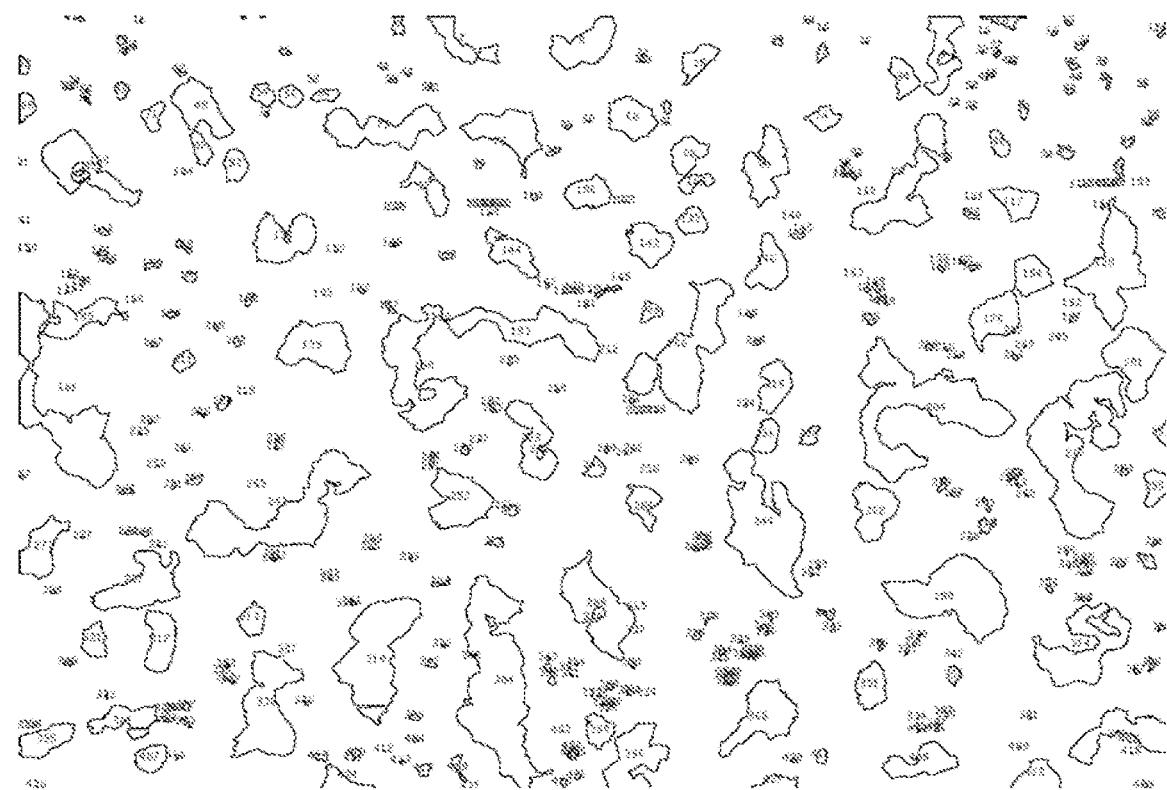

FIG. 26 same picture as in FIG. 25 where W rich carbides (white sections in FIG. 25) are marked and used for calculation of carbide size and area.

Figure 27:
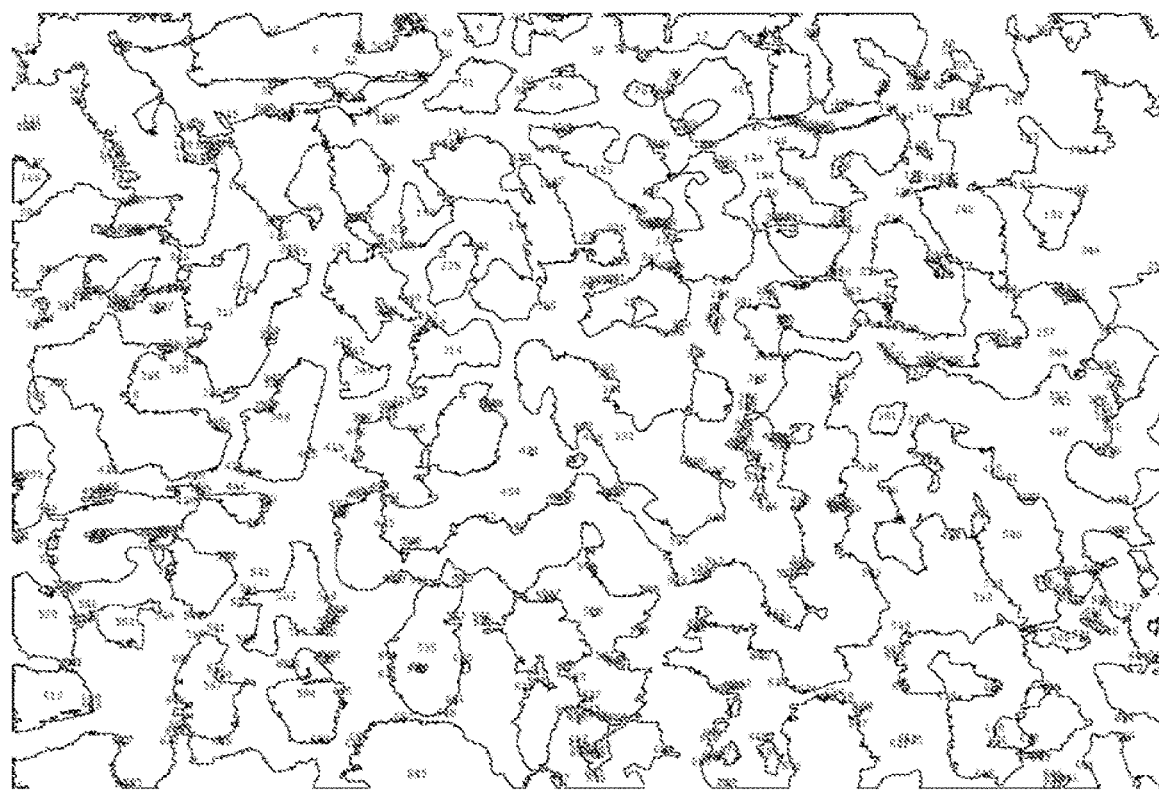

FIG. 27 same picture as in FIG. 25 where Cr rich carbides (grey sections in FIG. 25) are marked and used for calculation of carbide size and area.

Figure 28:
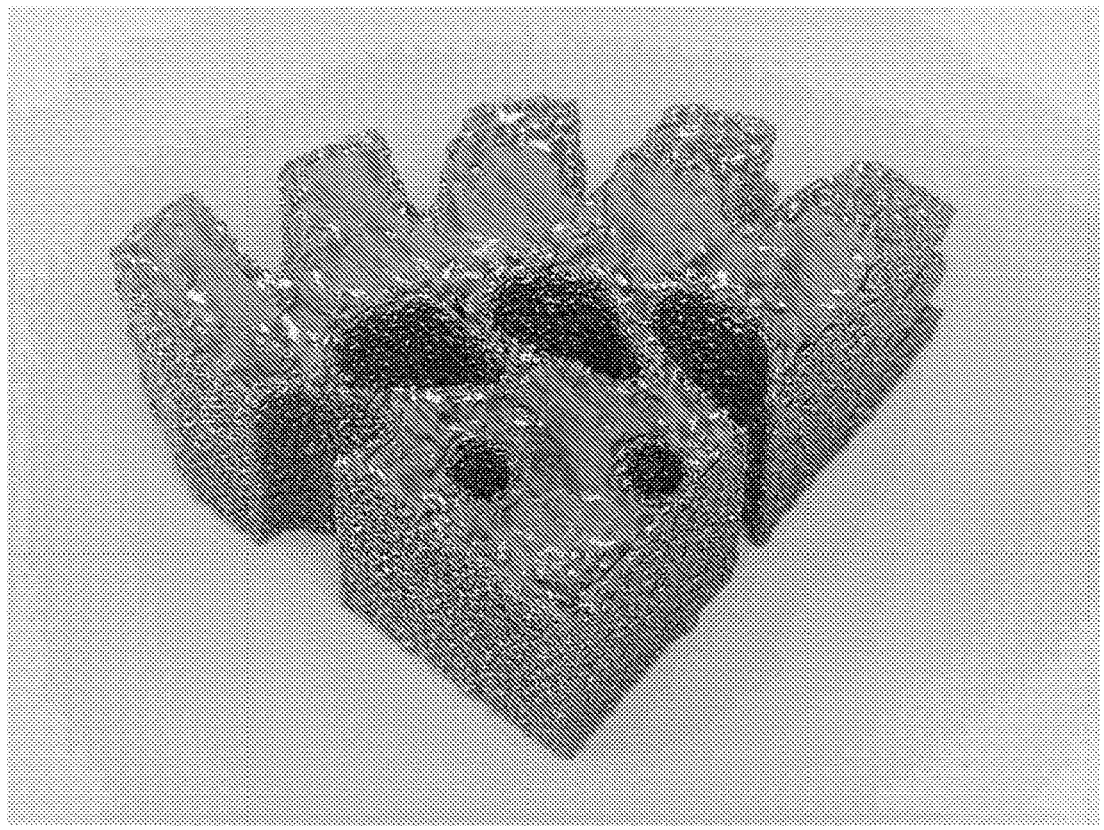

FIG. 28 a photo of a printed complex test piece, a quarter of a gear cutting hob with lightweight channels prepare according to the present invention.

DETAILED DESCRIPTION OF THE INVENTION

In the present application the term three-dimensional printing or 3D-printing or free forming or additive manufacturing denotes the same thing and is used interchangeably.

In the present application the term "melting point" or "melting temperature" denotes the same thing and is used interchangeably and denotes the liquidus point.

The Alloy and the 3D-Printed Product

The aim of the present invention is to present a three-dimensional (3D) printed product made of, or comprising, a cobalt-based alloy. The alloy comprises a metal matrix and grains of carbides embedded in the metal matrix. The alloy is based on cobalt and further comprises chromium, tungsten and carbon. The alloy is a high carbon, high tungsten cobalt alloy. Preferably the alloy has a very low oxygen content, preferably an oxygen content equal to or less than 100 ppm by weight, more preferably less than 50 ppm by weight. The alloyed powder used for the additive manufacturing of the product according to the present invention is in form of mainly spherical particles where the mean particle size of the powder is less than or equal to 200 μm. Preferably the mean particle size of the powder is greater than or equal to 20 μm and less than or equal to 200 μm. More preferably the mean particle size of the powder is greater than or equal to 40 μm and less than or equal to 150 μm. The alloy powder according to the present invention may be prepared by gas atomization.

The cobalt content in the alloy is equal to or greater than 30 wt %. In one embodiment the content is equal to or greater than 35 weight % or equal to or greater than 40 weight % or equal to or greater than 45 weight %, or equal to or greater than 50 weight %, preferably equal to or less than 73.5 weight %, or equal to or less than 70 weight %, or equal to or less than 65 weight %, or equal to or less than 55 wt %. In one embodiment the cobalt content is 45-55 wt %. In one embodiment the cobalt content is defined as balanced.

The chromium content in the present alloy is equal to or greater than 12 weight % to equal to or less than 25 weight %. In one embodiment the chromium content is equal to or greater than 14 weight %, or equal to or greater than 16 weight %, preferably equal to or less than 24 weight %, or equal to or less than 22 weight %, or equal to or less than 20 weight %, or equal to or less than 18 weight %. In one embodiment the chromium content is equal to or greater than 12 weight % to equal to or less than 22 weight %. In another embodiment the chromium content is equal to or greater than 12 weight % and equal to or less than 15 weight %. In another embodiment the chromium content is equal to or greater than 14 weight % and equal to or less than 18 weight %. In yet another embodiment the chromium content is equal to or greater than 19 weight % and equal to or less than 22 weight %.

Tungsten is present in the alloy at a content equal to or greater than 12 weight % and equal to or less than 30 weight %. In one embodiment the tungsten content is equal to or greater than 15 weight %, or equal to or greater than 20 weight %, or equal to or greater than 22 weight %, or equal to or greater than 24 weight %, preferably equal to or less than 29 weight %, or equal to or less than 27 weight %, or equal to or less than 25 weight %. In another embodiment the tungsten content is equal to or greater than 20 weight % and equal to or less than 30 weight %, or equal to or greater than 21 weight % and equal to or less than 29 weight %.

The amount of chromium and tungsten influence the melting point and therefore the sum of the two should preferably be lower than 50 weight %. In one embodiment the sum of the chromium and tungsten content is equal to or lower than 48 weight %, or equal to or lower than 46 weight %, or equal to or lower than 44 weight %. In one embodiment the amount of tungsten by weight % is equal to or higher than the amount of chromium by weight %.

Carbon forms tungsten carbides with the tungsten present in the alloy and these carbides in turn provide mechanical strength and hardness to the 3D-printed product. The carbon content of the alloy of the present invention is equal to or greater than 2.5 weight % and equal to or less than 5 weight %. In one embodiment of the present invention the carbon content is equal to or greater than 2.7 weight %, or equal to or greater than 2.9 weight %, or equal to or greater than 3.1 weight %, or equal to or greater than 3.3 weight %, or equal to or greater than 3.5 weight %, or equal to or greater than 3.7 weight %, or equal to or greater than 3.9 weight % but preferably equal to or less than 4.8 weight %, or equal to or less than 4.6 weight %, or equal to or less than 4.4 weight %, or equal to or less than 4.2 weight %, or equal to or less than 4.0 weight %. In another embodiment the carbon content is equal to or greater than 2.7 weight % and equal to or less than 4.5 weight %, such as equal to or greater than 2.9 weight % and equal to or less than 4.2 weight %, or 3.1 weight % to 3.9 weight %.

In one embodiment of the present invention the alloy has a content of chromium equal to or greater than 15 weight %, and equal to or less than 20 weight %, a content of tungsten equal to or greater than 13 weight %, and equal to or less than 30 weight %, and a content of carbon equal to or greater than 2.7 weight %, and equal to or less than 4.2 weight %.

In another embodiment the alloy has a content of chromium equal to or greater than 12 weight %, and equal to or less than 15 weight %, a content of tungsten equal to or greater than 27 weight %, and equal to or less than 30 weight %, and a content of carbon equal to or greater than 2.7 weight %, and equal to or less than 3.0 weight %.

In yet another embodiment the alloy has a content of chromium equal to or greater than 19 weight % and equal to or less than 22 weight %, a content of tungsten equal to or greater than 20 weight % and equal to or less than 22 weight %, and a content of carbon equal to or greater than 3.7 weight % and equal to or less than 4.2 weight %.

In yet another embodiment the alloy has a content of chromium equal to or greater than 18 weight % and equal to or less than 20 weight %, a content of tungsten equal to or greater than 21 weight % and equal to or less than 25 weight %, and a content of carbon equal to or greater than 3.9 weight % and equal to or less than 4.3 weight %, and balance cobalt.

In yet another embodiment the alloy has a content of chromium equal to or greater than 19 weight % and equal to or less than 21 weight %, a content of tungsten equal to or greater than 20 weight % and equal to or less than 23 weight %, and a content of carbon equal to or greater than 3.8 weight % and equal to or less than 4.2 weight %, and cobalt as ballast; and wherein the sum of chromium and tungsten content (Cr+W) is 40 to 43% such as 41 to 42 and the chromium/carbon ratio is 4.5 to 5.5 such as 5.0 to 5.3.

In yet another embodiment the alloy has a content of chromium equal to or greater than 25 weight % and equal to or less than 27 weight %, a content of tungsten equal to or greater than 15 weight % and equal to or less than 17 weight %, and a content of carbon equal to or greater than 4.4 weight % and equal to or less than 4.6 weight %.

The alloy may further comprise traces or impurities of other elements. These elements may be but is not limited to niobium, nickel, manganese, silicon, molybdenum, boron, tantalum, and iron or a combination thereof. In one embodiment the alloy comprises at least one of niobium, nickel, manganese, silicon and iron. In one embodiment the alloy comprises up to 3 weight % of at least one of niobium, nickel, manganese, silicon and iron. In one embodiment the alloy comprises at least one of niobium, nickel, manganese, silicon and iron in an amount of equal to or greater than 0.5 weight %, or equal to or greater than 1 weight %, or equal to or greater than 2 weight %, but equal to or less than 3 weight %. The total content of other elements such as niobium, nickel, manganese, silicon and iron may be 1-5 weight %.

The components of the alloy and the amount of the components are selected so that the melting temperature is equal to or lower than 1750° C., preferably equal to or lower than 1600° C., or equal to or lower than 1500° C. In order to optimize the alloy and the properties of the product the melting temperature of the alloy is preferably greater than or equal to 1300° C., or greater than or equal to 1350° C., or greater than or equal to 1400° C. One advantage of using an alloy having a melting temperature of lower than 1600° C. is that many of the well-known powder metallurgy techniques which produces spherical powder fractions may be used to prepare the alloy powder of the present invention.

One advantage of the present invention is that it does not require the use of any organic binders or adhesives and therefore the 3D-printed product usually comprises a combined content of carbon, tungsten, chromium and cobalt which is equal to or greater than 95 weight %. In one embodiment of the invention the combined content of carbon, tungsten, chromium and cobalt is equal to or greater than 97 weight %. Preferably the combined content of carbon, tungsten, chromium and cobalt is equal to or greater than 98 weight %. More preferably the combined content of carbon, tungsten, chromium and cobalt is equal to or greater than 99 weight %. Most preferably the combined content of carbon, tungsten, chromium and cobalt is equal to or greater than 99.9 weight %. In one embodiment of the invention the amount of organic compounds in the 3D-printed product is equal to or less than 0.1 wt %. Preferably the amount of organic compounds in the 3D-printed product is equal to or less than 0.05 wt %. In one embodiment of the invention the product is essentially free from any organic compounds. The carbon in the product is mainly in form of carbides such as tungsten and chromium carbides, but elemental carbon and elemental tungsten can also be present in the matrix.

Metal compounds that contain carbides sometimes suffer from that carbides forms clusters, dendritic or net structures which makes the material more brittle. Typically in these types of alloys, especially with high Cr (~30 wt %) and C (~2.5 wt %) content or more, Cr forms carbides (such as $Cr_7C_3$ and $Cr_{23}C_6$ but also other stochiometric types). These carbides typically grow quickly in solidification stage which results in large and long stringers with dimensions from 100-1000 μm in size see FIGS. 6 to 11. These large and sharp formed carbides result in stress concentration and reduce the macro fracture toughness, thermal shock and fatigue resistance in the material. Therefore, one of the advantages of the present invention is that the 3D-product contains carbides grains or particles that are in general smaller than those found in the prior art and are well-dispersed in the matrix. This is achieved by on the one hand reducing the Cr content and on the other hand using the additive manufacturing technology to ensure a very rapid solidification rate.

The multiphase alloy comprises a matrix of mainly cobalt but also chromium, tungsten and carbon. There are carbides of chromium and tungsten, CrC-types and WC, present in the matrix. The chromium carbides may surround the tungsten carbides which in turn are surrounded by the matrix.

One advantage of the present invention is the achievement of improved mechanical properties of the 3D-printed product. The hardness of the product, after HIP, may be at least 700 HV, such as at least 750 HV, or at least 800 HV, or at least 850 HV, or at least 870 HV. In one embodiment the hardness is 800-950 HV or 850-900 HV. The HIP process was done by keeping the product at 1120-1160° C. for 3 hours at 1000 bar (100 MPa). In one embodiment the hardness prior to HIP is 970-1000 HV2 kg. The hardness was determined by using 2 kg Vickers indention, according to standard SS-EN ISO 6507. Additionally the fracture toughness measured as total crack length, i.e. the sum of the up to four cracks formed at the corners of the diamond-shaped indentation using a 250 kg Vickers indent at room temperature, is very high and the crack length may be as short as 350 μm or less, or 300 μm or less, or 250 μm or less, or 150 μm or less, or 100 μm or less, or 50 μm or less, or 30 μm or less, or 10 μm or less. In one embodiment no cracks were formed. The crack length was determined using Palmqvist fracture toughness method but with a higher load (250 kg) and only presented here as the sum of the crack lengths not as a K1c value. The indentation is performed three times and at three different places on the sample and the average of the sums of the crack lengths is presented. The reason to use a higher load is that at lower loads often no cracks were formed and therefore no value for the toughness could be obtained. The crack length indentation tests were performed on cross section samples, ground and polished in steps down to 1 μm diamond suspension in the same way as in the hardness standard ASTM E384-16. Many of the alloys or products according to the present invention do not form any cracks at all during the tests. However, the fracture toughness at high temperature such as 750° C. or 800° C. is very difficult to measure, but it is well known that crack initiation occurs at the maximum stress point which is set by the largest "error" or "imperfection" in the material. In alloys such as described in this invention, this largest "error" or "imperfection" is the biggest carbide.

Without being bound by theory but the mechanical properties of the present invention is believed to be a result of the fine microstructure of the product. The 3D-printed product is essentially free from dendritic structures of carbide grains and instead the carbides are essentially spherical or round. The carbide grains are small in size and they are evenly distributed within the matrix as seen in the figures. The alloy of the 3D-printed product usually does not comprise any carbides having a size equal to or larger than 30 μm, preferably not larger than 20 μm, or not larger than 10 μm. In one embodiment the maximum carbide size is 5 μm. Still the total amount of carbides in the printed material is very high, at least 50 vol % of the area, or at least 60 vol %, or at least 65 vol %. In one embodiment the total amount of carbides is 65-70 vol % such as around 68 vol %. The total amount of carbides in a sample is determined using SEM. A sample surface is selected which is believed to be representable of the product. The edge of each carbide is marked and from which the total carbide area is calculated using any suitable software. FIG. 25-27 shows an example where carbide edges have been marked. The volume fraction of the carbide is then translated from the calculated area. The average area of the carbides may be 5 $\mu m^2$ or less, such as 3 $\mu m^2$ or less. In these figures, the carbide areas and size are not calculated since it is difficult to see the Not only does the present invention facilitate the preparation of products and components that have improved mechanical properties which may withstand corrosion, it also makes it possible to prepare products with advanced or complex three-dimensional shapes and forms. The product may comprise cavities, channels or holes and the product may have curved portions or spiral forms. These shapes or forms are prepared without any removal of the alloy besides any optional after treatments. The cavities, holes or channels may be curved, that is to say that their surfaces may be curved, helical or spiral or the like. In some embodiments the product contains cavities where the cavities are sealed or have an opening wherein the diameter or width of the opening is less than the diameter or width of the underlying cavity. The product may be a cutting tool such as a milling cutter, shaper cutter, power skiving cutter, drill, milling tool etc, or a forming tool such as extrusion head, wire drawing die, a hot rolling roll, etc., or wear components such as pumps or valve components, gliding or roll bearing rings, etc.

The Method

Products according to the present invention are prepared by three-dimensional printing (also known as free forming, additive manufacturing) of an alloy powder. The method uses a free forming apparatus (a 3D-printer or an Additive Manufacturing machine) having a chamber in which the powder is arranged. The method of free forming comprises forming a layer of a powder of an alloy in an oxygen-low environment in the chamber as defined below. One suitable free forming apparatus is an electron beam apparatus (EBM) from Arcam such as the ARCAM A2X. The alloy comprises carbon, tungsten, chromium and cobalt in the amounts described above and the choice of alloy depends on the desired properties of the final product. The content of oxygen and other impurities in the reactor should be as low as possible, such as equal to or less than 10 ppm (corresponding to a gas purity grade 5), or equal to or less than 1 ppm (corresponding to a gas purity grade 6) and the environment in the reactor may comprise inert gases such as argon or helium. There may also be a vacuum in the reactor where the pressure in the reactor may be $1\times10^{-4}$ mBar (0.01 Pa) or less, or $1\times10^{-3}$ mBar (0.1 Pa) or less. In one embodiment the initial pressure in the reactor is around $1$-$10\times10^{-5}$ mBar ($1$-$10\times10^{-3}$ Pa) and then an inert gas such as helium or argon is added to increase the pressure to $1$-$5\times10^{-3}$ mBar (0.1-0.5 Pa). The powder is then melted locally by exposing the powder to an energy beam during a period of time sufficient to melt it. The energy beam may be a laser beam or an electron beam. The beam is swept across the powder in a pattern. The duration of the sweep may range from seconds to minutes depending on the alloy and the size of the particles in the powder. The melted powder is then allowed to at least partly solidify into a multiphase cobalt alloy. Another layer of powder may then be applied on top of the solidified alloy.

In order to avoid crack formation the product is maintained at an elevated temperature during the printing or the formation of the 3D-printed product. Crack formation is probably due to a combination of increased internal stresses and increased material brittleness at lower temperatures. The increase in internal stresses is caused by the volume changes at the phase transformations. One such transformation occurs at around for example 430° C. where fcc transform into hcp, but there are other phase transformations as well at higher temperatures. For example the plate or the table that the product is built on may comprise a heater. The 3D-printed product may therefore have a temperature gradient in it during the building of the product but the lowest temperature in the product or the temperature of the plate or the table that the product is built on during the building process is preferably 300° C. or higher, or 400° C. or higher, or 500° C. or higher, or 550° C. or higher, or 600° C. or higher, or 700° C. or higher, or 800° C. or higher, or 900° C. or higher, but lower than the melting temperature of the alloy but usually not higher than 1100° C., or 1000° C. or lower.

Figure 3:
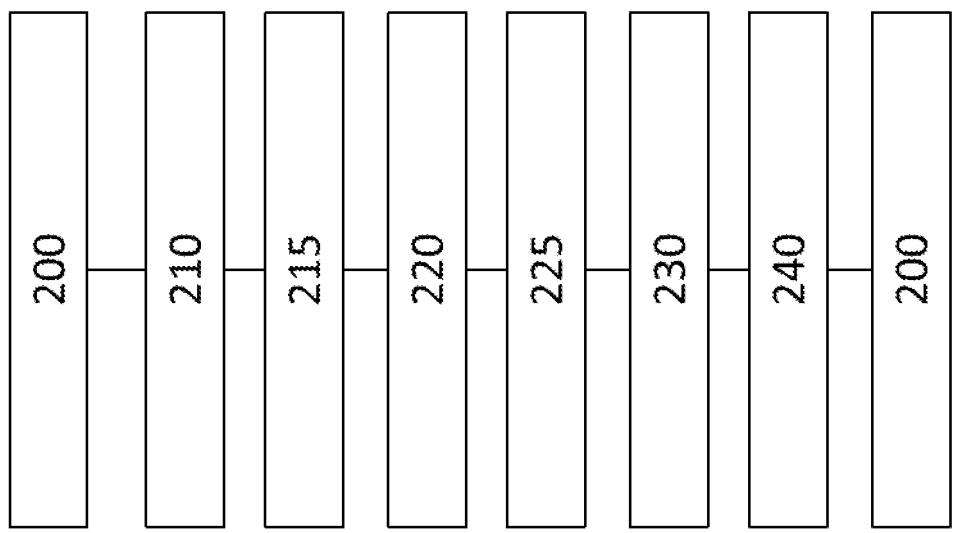
FIG. 3, schematic figure of an embodiment of the method of the invention.

FIG. 3 illustrates a flow diagram of the steps of an embodiment of a method according to the present invention for preparing one layer. The method for manufacturing a metallic multiphase material starts in step 200. In step 210, a powder material of an initial metallic multiphase material is provided. The build platform is then heated, by a scanning beam or by another external heating method step 215. The initial metallic multiphase material comprises a metal matrix in which carbides are embedded. Before starting the processing oxygen is removed from the environment and the build support is pre-heated 215. The powder of the initial metallic multiphase material is placed in step 220 in an oxygen-low environment as previously defined. The powder of the initial metallic multiphase material is preferably first preheated in two steps 225 to maintain the temperature and then locally melted in a first portion in step 230. In step 240, the final metallic multiphase material is solidified. The method ends in step 299.

Figure 4:
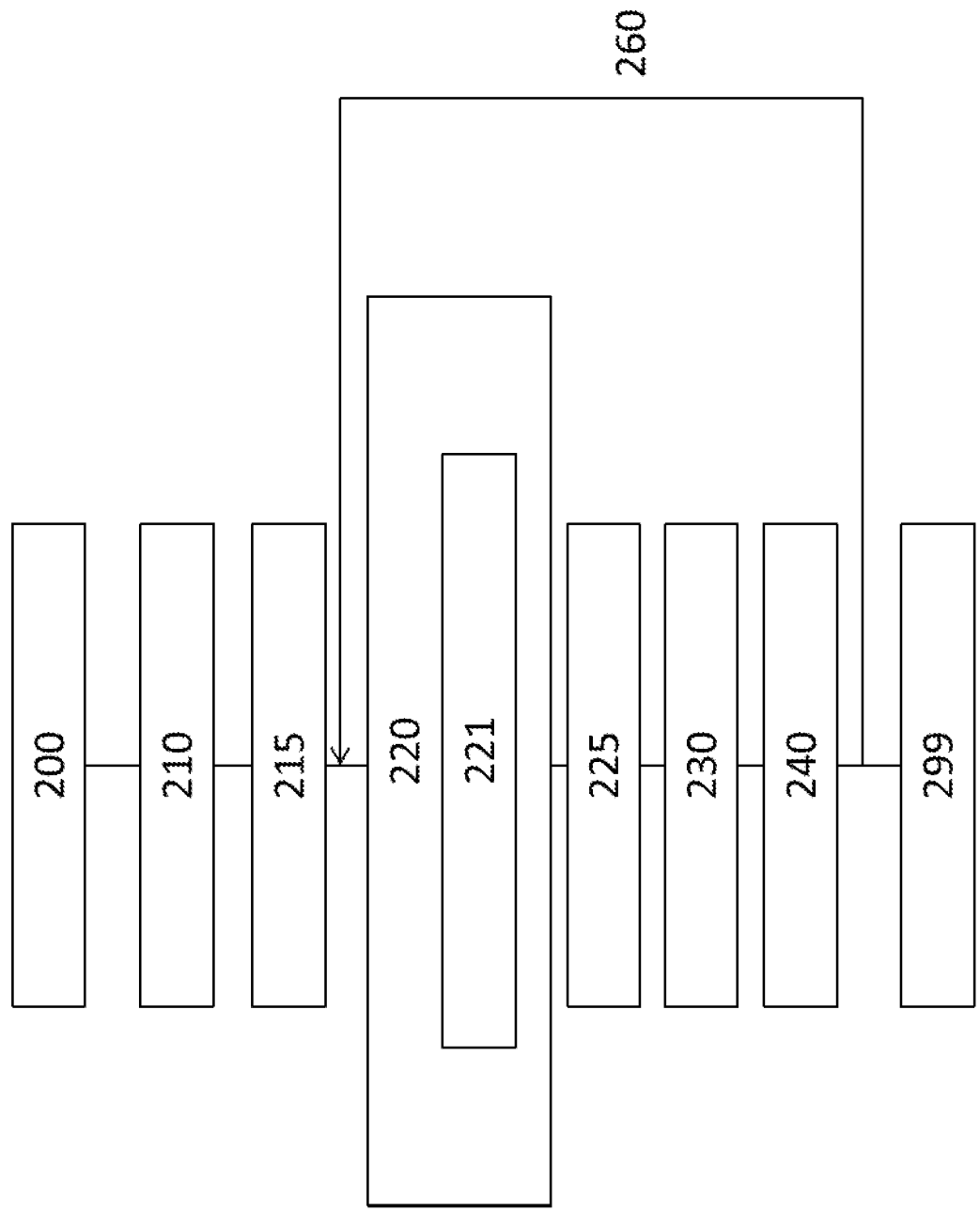
FIG. 4, schematic figure of an embodiment of the method of the invention.
Figure 6:
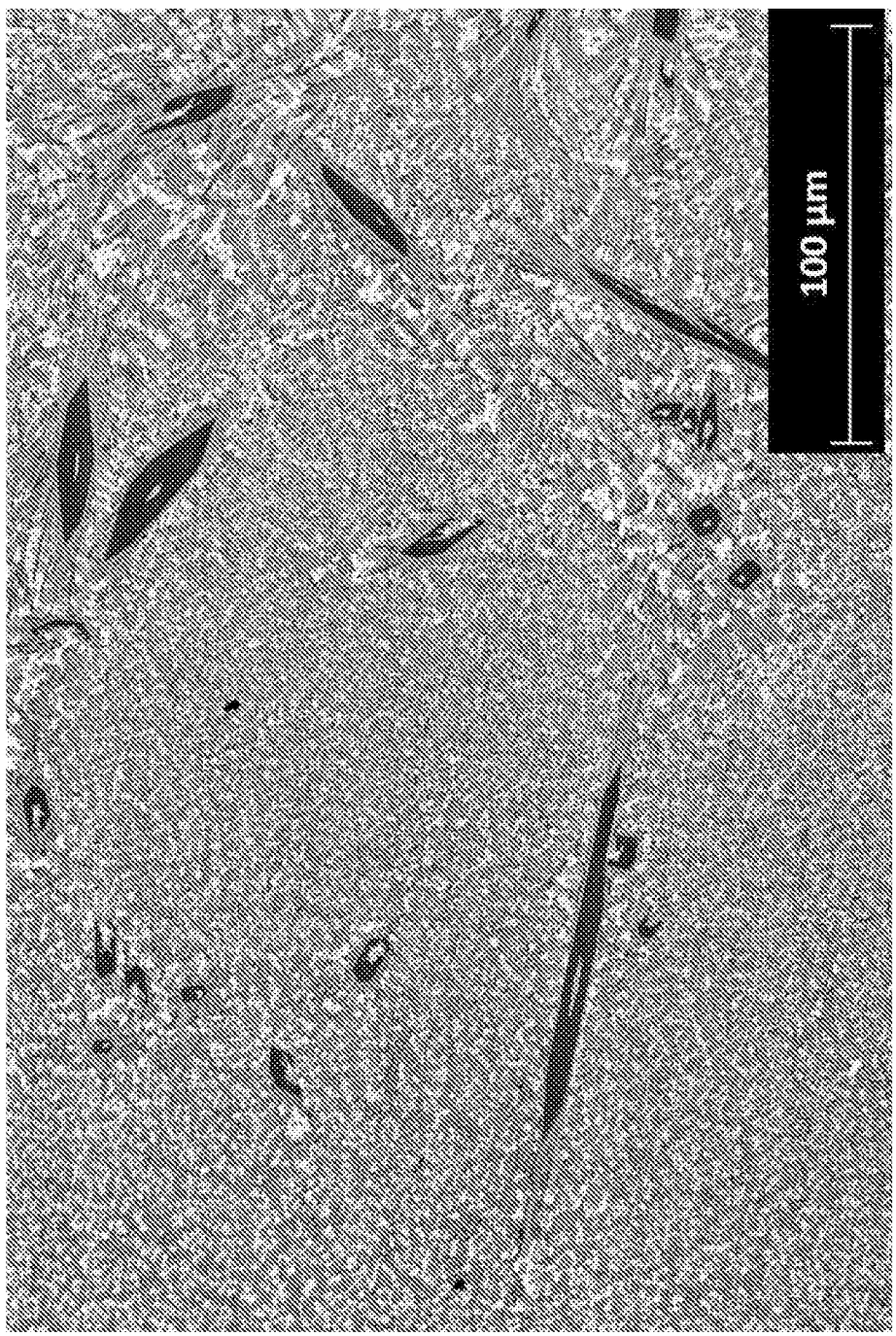
FIG. 6, SEM picture of microstructure of Rexalloy 33.
Figure 7:
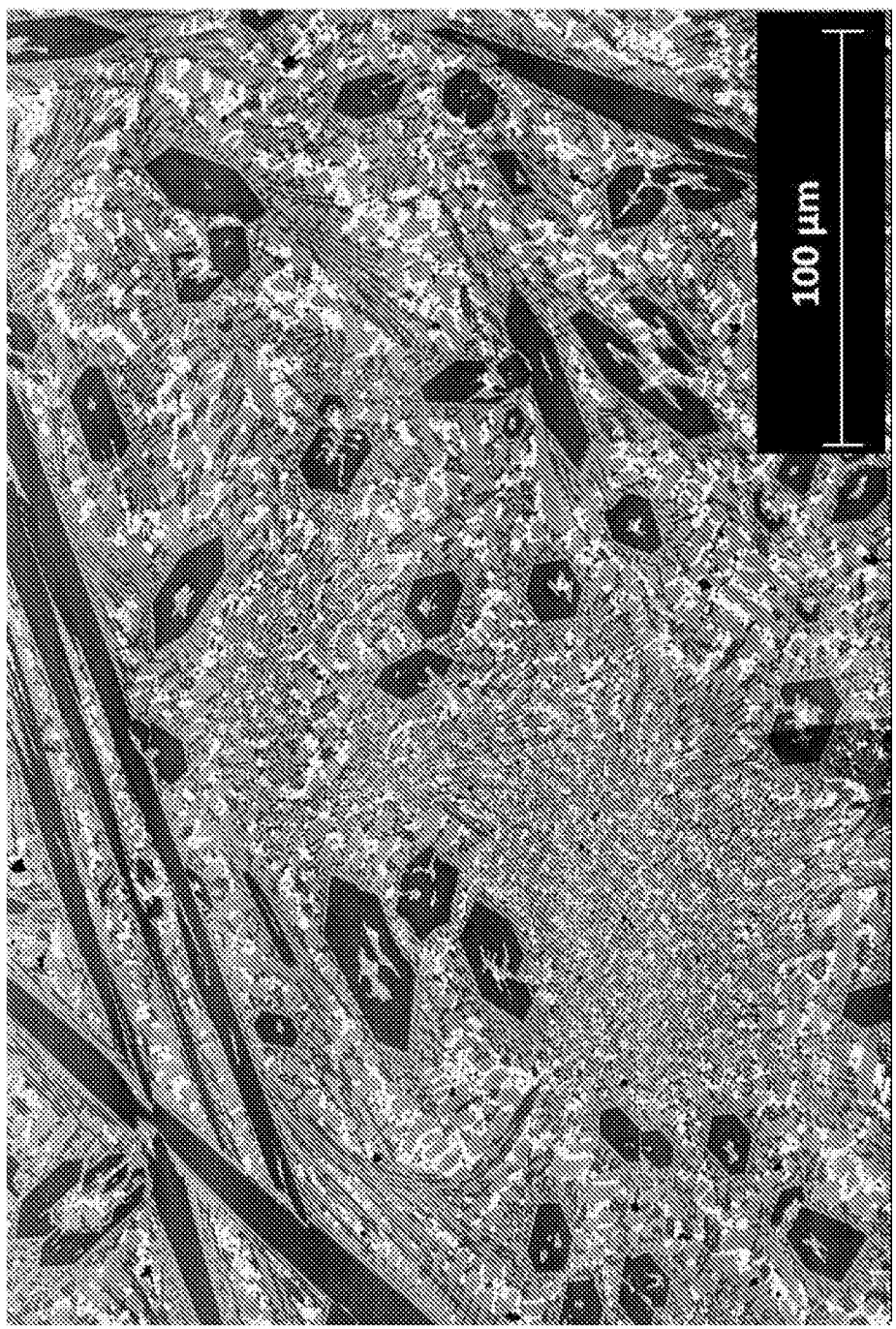
FIG. 7, SEM picture of microstructure of Stellite Star J.
Figure 8:
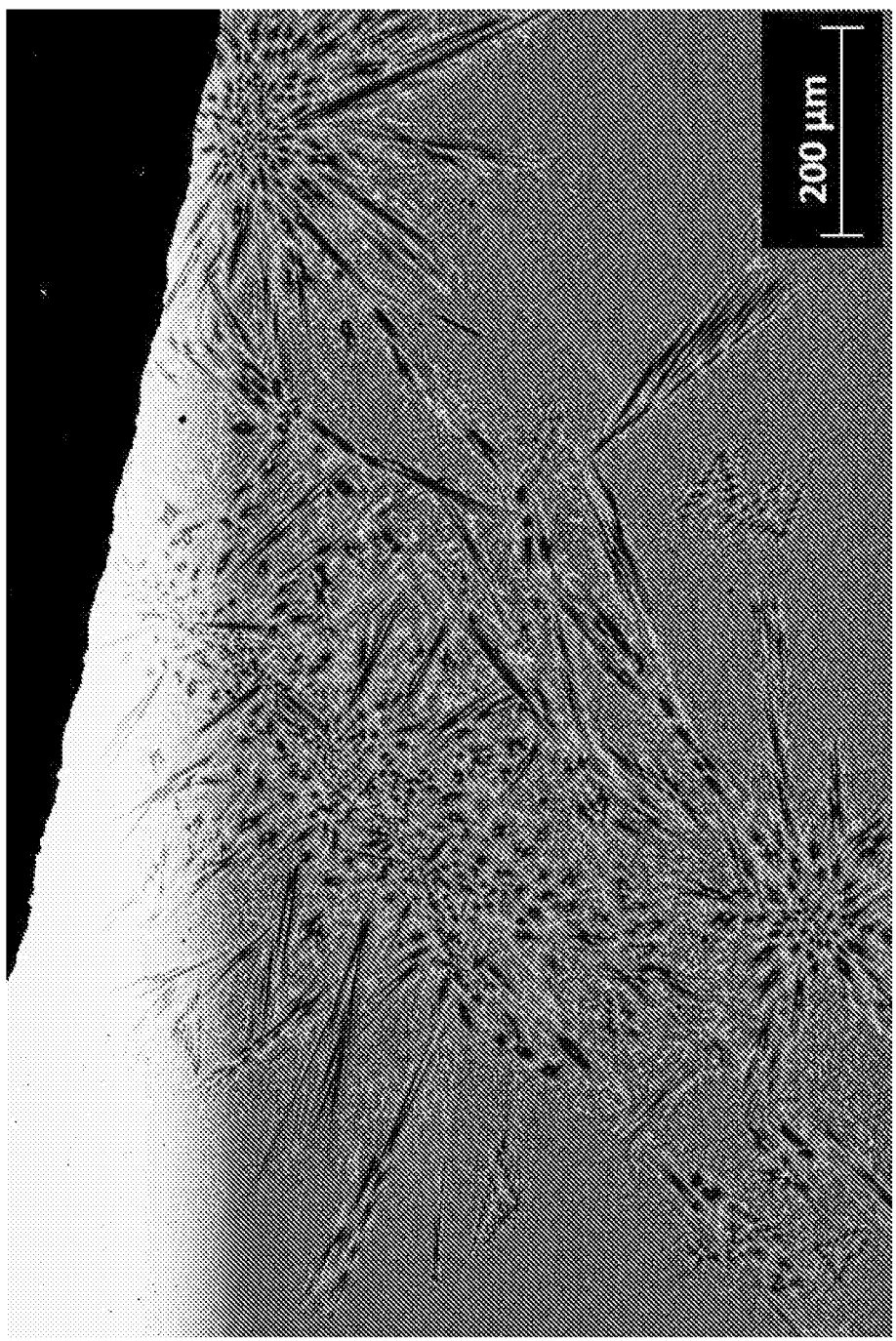
FIG. 8, SEM picture of microstructure of Tantung G. Freeborn wood cutter.
Figure 9:
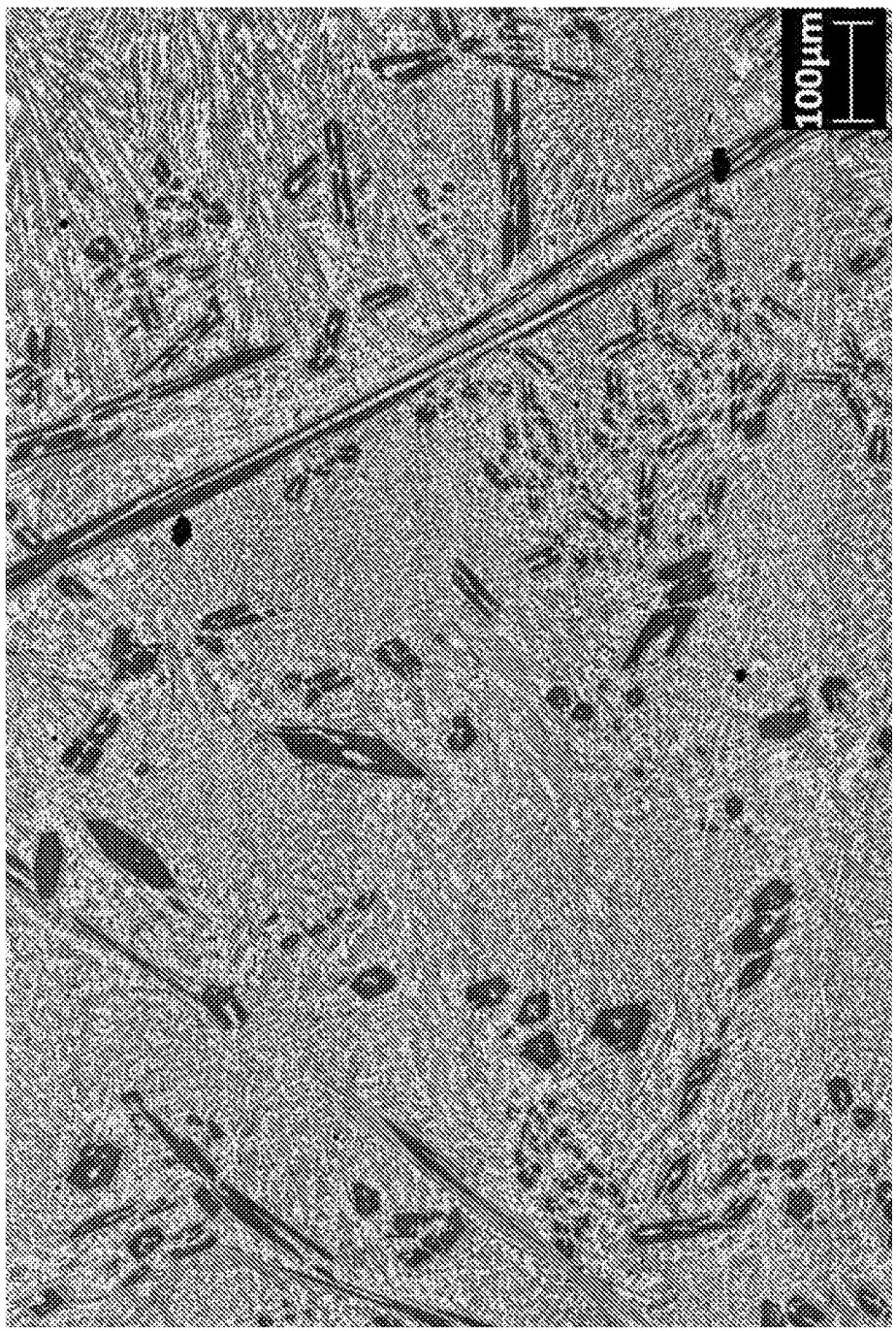
FIG. 9, SEM picture of microstructure of Stellite 2400.
Figure 10:
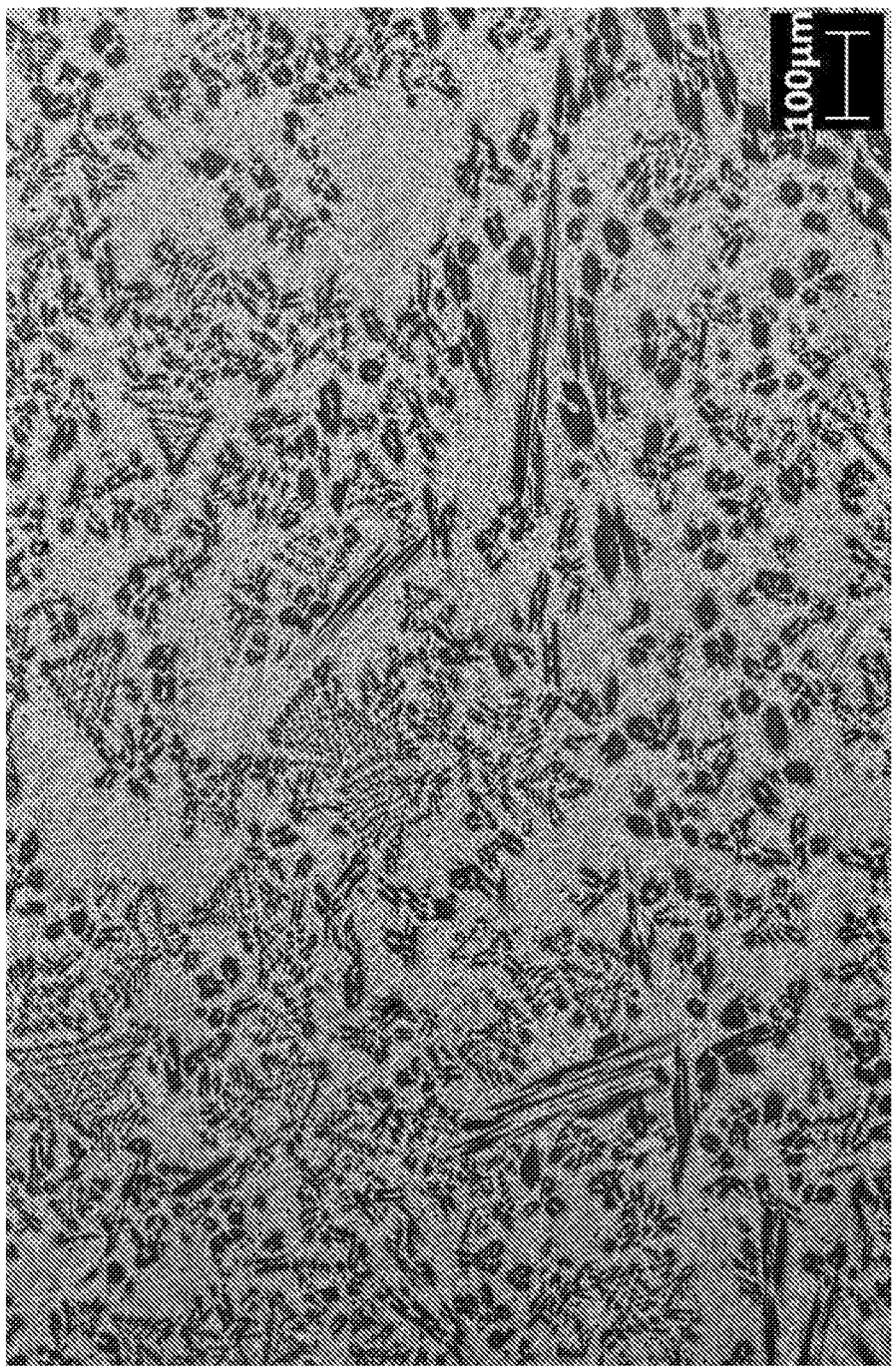
FIG. 10, SEM picture of microstructure of Stellite 98M2.

FIG. 4 illustrates a flow diagram of steps of another embodiment of a method for producing a 3-D product according to the present invention. The method for manufacturing of an object of a metallic multiphase material starts in step 200. Preferably a continuous preheat of the metal powder bed is performed in two steps 225, PreHeat1 and PreHeat2, where the PreHeat1 is performed on the whole build plate area with an energy beam (with a beam energy of e.g. 42 mA and repeated 10 times), and the PreHeat2 is performed on and nearby the intended following melting zone area (e.g. with a beam energy 47 mA, repeated 6 times). The purpose of the pre-heating steps is to maintain the elevated temperature of the build and then to sinter the newly added powder to the underlying layer. This method comprises all the steps 210, 215, 220, 225, 230 and 240 of the method for manufacturing of a metallic multiphase material of FIG. 3. The step 220 comprises in this embodiment a step 221 in which a thin layer of the initial metallic multiphase material is provided in the oxygen-low environment as described above. Preferably, the process is repeated from step 220 as indicated by the broken arrow 260 until a complete object is achieved and the method is ended in step 299.

The advantage of using EBM in comparison with laser is that thicker powder layers may be prepared and powders with larger particles may be used.

The growth of the carbides occurs during the solidification of the molten material and in order to limit the size of the carbides the growth time should be limited. The solidification time is mainly influenced by the heat diffusion rate, the heat of solidification and the heat diffusion distance. The solidification rate in traditional casting techniques may be enhanced by cooling down the melted material using any suitable technique, such as casting in highly-cooled refractory molds or to cast smaller details. Also, in existing prior art cladding techniques the cooling speed is also high, but not high enough to prevent carbide growth or to receive a fully dense material, as shown in prior art market study part.

However, the present alloy and the present method generates a melt pool (a pool of melted alloy) during the 3D-printing has a diameter that is equal to or less than 2 mm in diameter, usually equal to or less than 1 mm, or equal to or less than 0.5 mm, or equal to or less than 0.25 mm. A smaller melt pool results in shorter solidifications times and thereby smaller carbides, and in the present invention the melt pool size is many times smaller and very much more rapidly cooled than in traditional techniques. The present invention also results in the possibility to produce large components. For example, the present method allows the preparation of components or products having a weight of 1 kg or more.

The surface of the obtained 3D-printed multiphase cobalt alloy has a rough surface and the 3D-printed products may have some powder residues on their surfaces. Therefore, the method may further comprise an after treatment which may involve heating or surface treatment. The heat treatment may further increase the mechanical properties of the product. However, due to the improved mechanical properties of the 3D-printed products of the present invention, in general they do not have to be heat treated in order to obtain the necessary mechanical properties. The method may further comprise a step comprising finishing the surface of the obtained product by grinding, electron discharge machining (EDM), polishing or any other suitable method. Such surface treatment may be used for example to provide a nicer finish, sharp edges and smooth surfaces. The 3D-printed product of multiphase cobalt alloy may also be heat treated as described above and followed by a surface treatment such as EDM.

Figure 18:
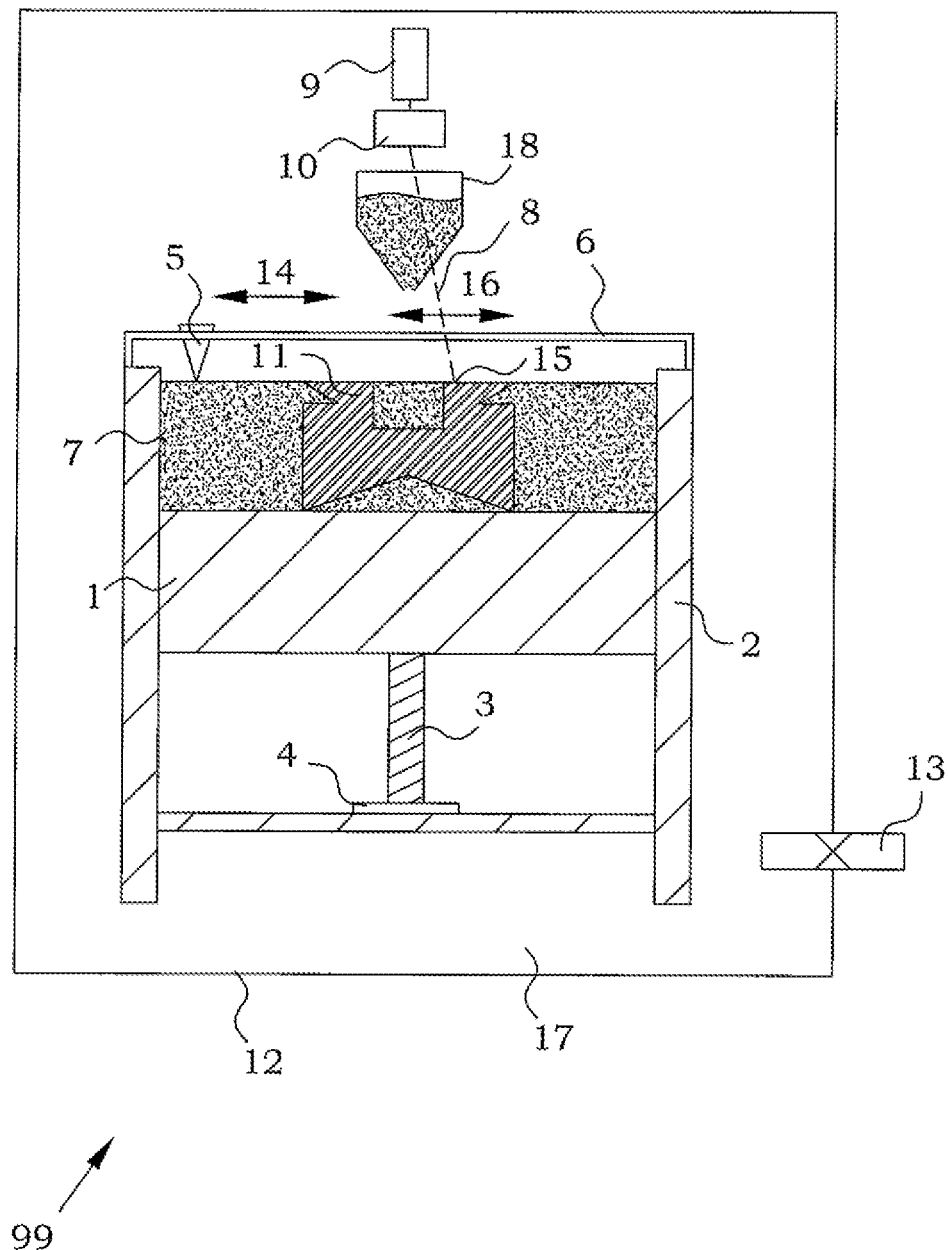
FIG. 18, a schematic cross sectional view of an embodiment of an apparatus that may be used to prepare the 3D-printed product or conduct the method according to the present invention.

FIG. 18 describes an embodiment of a configuration of a machine arrangement 99 suitable for producing components or objects in this new material. The machine arrangement 99 comprises an adjustable working table 1, vertically movable and placed inside a bin 2. The vertical position of the working table 1 is finely adjustable between a minimum and maximum height and is typically adjusted by a screw 3 and a screw-nut 4 or other actuator means. A powder-containing container 18 is arranged to add powder to the top of the present build. A powder rake 5 is arranged to be movable, as indicated by the arrow 14, back and forth in a chute 6 over the working table 1. The powder-containing container 18 comprises powder of an initial metallic multiphase material. During the motion of the powder rake 5, the powder rake 5 distributes the metal powder into a metal powder layer 7 on top of any structures present on the working table 1.

An energy beam canon 9, e.g. laser or an electron gun generates an energy beam 8 with a high energy density. The energy beam 8 can for example be a laser beam or an electron beam or a combination thereof. A beam controlling unit 10 focuses and positions the energy beam 8 onto a particular spot 15 on the top of the powder layers 7. A controlling computer (not shown in FIG. 18) controls the working table 1, the motion of, and the distribution of powder by, the powder rake 5, the energy beam 8, and the beam controlling unit 10. The controlling computer can thereby cause, as indicated by the arrow 16, the spot 15 to move over the surface of the metal powder layers 7. The melting and the following solidifying of the focused-on initial metallic multiphase material is thereby repeated for additional portions of the initial metallic multiphase material of the powder layer 7. At the same time, the energy density and focus of the energy beam 8 can be varied as desired. The energy beam 8 is intended to cause a local melting of the metal powder 7 at the spot 15, and when the energy beam 8 is moved over the surface, a solid component 11 (or a plurality of components) made of the melted and solidified metallic multiphase material is successively built up. The controlling computer has information about the dimension and geometry of the component(s) 11 under construction. Preferably this is in the form of slices, each of which has a thickness which corresponds to the thickness of a powder layer and for each powder layer the computer controls the heating/melting of the energy beam based on the information related to the actual slice being formed. When all parts of the current metal powder 7 surface that should be integrated into an object that is to be manufactured have been melted and solidified and thereby joined to form the common body of the produced component 11, the build platform is lowered, and powder containing container 18 releases new initial metallic multiphase material and the powder rake 5 is again moved over the working table 1, distributing a new layer of metal powder. The local melting and solidifying is reiterated on the new layer of initial metallic multiphase material placed over the common body. Further reiterations of this local melting and solidifying result in the formation of a three-dimensional object or component 11.

In an alternative embodiment, the motion of the energy beam could be achieved by mechanical means, preferably controlled by a controlling computer.

The temperature of the component is, as indicated above, of importance. During the main time of the manufacturing, each portion of the component should be kept at a temperature low enough to enhance the conduction of heat away from the melt and thereby increase the solidification rate. However, in order to get a good adhesion of melted material to the common three-dimensional body, the temperature should not be too cold. The temperature of a body under construction needs to be kept at an elevated temperature as discussed above, such as higher than 300° C. or preferably higher than 430° C. Such parameters for an optimized temperature are strongly dependent on a number of factors but in the present invention the temperature must be kept high to avoid cracks. A higher substrate temperature, at least at the surface, can be obtained by scanning the energy beam over the surface of the powder layers for pre-heating of the powder, before the actual local melting takes place as described above. This step may be combined with heating of the working table. A lower substrate temperature can in a similar way be achieved by cooling the working table. Thereby, the final metallic multiphase material can be cooled in-situ at least during the solidification step following the local melting step.

Figure 19:
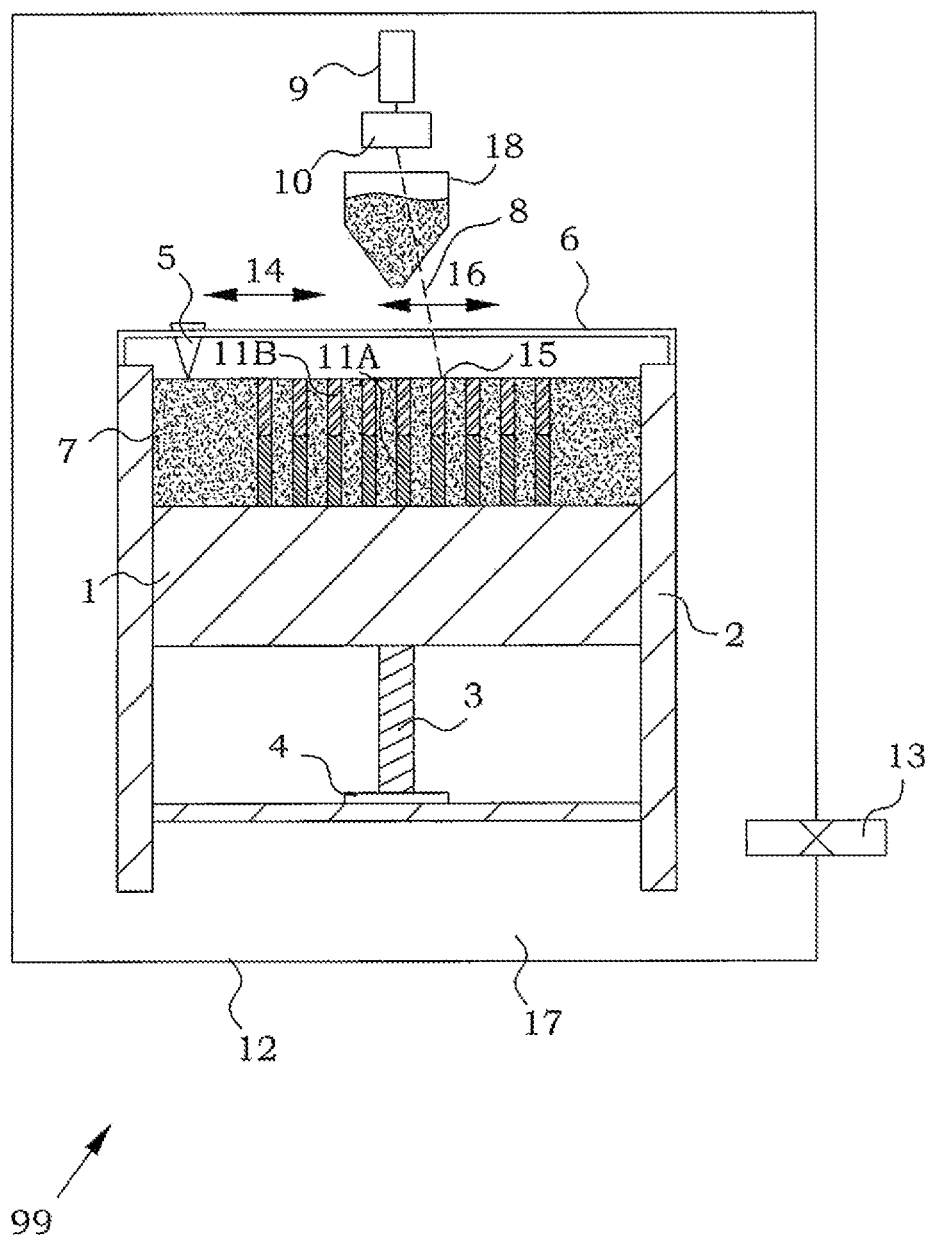
FIG. 19, a schematic cross sectional view of another embodiment of an apparatus that may be used to prepare the 3D-printed product or conduct the method according to the present invention.

FIG. 19 shows another embodiment of a machine arrangement 99 suitable for manufacturing according to the present invention. In this embodiment pre-produced details 11A are placed on the working table 1. The pre-produced details 11A could be a base material of any kind made in another process, it can be a base material with another composition, or it can also be e.g. a worn tool that is to be rebuilt. In this embodiment, the pre-produced details 11A are positioned on the working table before the 3-D printing process starts and the interior of the chute up to the level of the first spot to which new material is to be added is filled with material, typically the metal powder. The new material 11B is then added on top of already existing substrate. In other words, the powder is placed on top of a pre-produced solid support object, wherein the produced common body becomes attached to this support object. This support object could be e.g. an object to be repaired. In such an embodiment, the controlling computer might be provided with details of the position and material parameters of the pre-produced detail 11A.

The embodiments of FIGS. 18 and 19 can also utilize the same techniques to form components with negative surfaces. A negative surface is characterized in that a surface normal is directed downwards into a volume beneath the surface not comprising the same material as built in the component 11, i.e. typically unmelted metal powder. The working table 1 is shown, with a component 11 under construction on top. This component 11 has a negative surface 21. The method for creating such negative surfaces includes a procedure where the area over which the energy beam is moved for one iteration covers horizontal positions that are not covered by a corresponding area from a previous iteration. In this manner any shape of an outer surface can be created. The possibility to create negative surface allows manufacturing of details having shaped surfaces with surface normal directions differing by more than 180 degrees.

Therefore, holes and channels can be successfully formed by this technique. The component 11 of this embodiment comprises an internal channel 22. The channel is formed by successively adapting the area where the powder is melted to build a curved positive surface 23. The channel 22 is then covered by a curved negative surface 24. Such channels can advantageously be used, for example, for transporting cooling or heating media in the object during final use. The product or component may have a cavity or a channel and the cavity may be sealed or may have an opening with a diameter that is less than the diameter of the sealing. The angle of the curved channel may be more than 15°, or more than 30°, or more than 45°.

When using the technique described to build the new material, it is also obvious that the technique allows the building of several components (of the same type, or of different types) in the same chamber during the same run. It is only necessary to provide the controlling computer with the information necessary to determine where to build an object, and it is obvious that an object can be a single component or a part of one of several individual components.

In a typical non-limiting example shown in FIG. 19 the melting beam current in the cross-hatched area is continuously automatically varied by the machine to fulfill the automatic heat balance in the actual build. The maximum setting is typically 25-30 mA, such as 28 mA. In the cross-hatched area, the focus offset may be set to 8-12 mA such as 10 mA and the melting speed is also continuously varied by the machine to fulfill the different heating demands on each spot in the build (which can depend, for example on whether the spot is close to a border, negative surfaces, etc.).

EXAMPLES

Example 1

Prior Art Market Study

In order to determine the alloying content and microstructure of the group of conventional, commercially-available cast high carbon cobalt chromium alloys, a market analysis was performed, wherein the composition and microstructure of a number of real material pieces were analyzed, see FIG. 5.

Note that the Tantung analysis specification shown in FIG. 2 is extremely wide—two alloys with 2 wt % and 4 wt % C are extremely different in nearly every mechanical property. This is assumed to be a result of traditional casting techniques, where the content is not able to be controlled very accurately and therefore the properties of all alloy combinations in this wide specification are unknown. In addition, as will be shown here, in no case is the C content as high as the maximum amount specified in FIG. 2.

An important result, seen in FIG. 5. is that the actual carbon content in these types of cast alloys is generally 2.45 wt % or lower. This is a large difference from the specified carbon content as seen in FIG. 2.

It can also be seen that the hardness of these types of alloys is between 640 HV2 kg and 855 HV2 kg (approximately 57 and 66 HRC respectively), with the maximum 855 HV2 kg for the Stellite 98M2 alloy which has a relatively large addition (about 4%) of Ni. Also the Blackalloy 525 has 845 HV2 kg (approx. 65 HRC) and a corresponding high amount of Nb. However, one of the Tantung G alloys also has 2.6% of Nb, but only 640 HV. This shows that the microstructure is, as is well-known, important for the resulting hardness. Typically, Nb (and similarly Ta) is used to increase the stress rupture strength through dispersion strengthening in these types of alloys.

Regarding hardness, the user of these materials is typically used to read HRC, Rockwell hardness. However, at the upper region of this hardness (approx. 69-70 HRC) it is not possible to use a Rockwell indenter any more. Therefore, a Vickers indenter has been used in the whole hardness region in this invention. And, to compare, it is possible as a guideline to say that a hardness of 600 HV2 kg is approximately the same as 55 Rockwell C (HRC), 700 HV2 kg is approximately 60 HRC, 800 HV2 kg is approximately 64 HRC, 900 HV2 kg is approximately 67 HRC and 1000 HV2 kg is approximately 69 HRC, even though it is not possible to use a Rockwell indenter in the whole hardness range in focus in this invention. In addition, when measuring hardness with Vickers indenters, the use of different indentation loads also affect the results in these types of materials with a softer matrix and harder carbides.

In addition, a fracture toughness measurement was performed on these materials. This measurement was performed by indenting a Vickers tip at 250 kg load in a polished surface of three samples and then performing crack length measurement on the four indent corners in the SEM, resulting in a crack length sum. The average sum of the crack lengths is also shown in FIG. 5. It can be seen that for some of the existing alloys the crack lengths are very short, indicating a high toughness. However, the microstructures of the same alloys indicate large chromium carbides (examples shown below), and in these types of indentation tests the actual fatigue resistance and heat shock resistance are not measured. These types of alloys are more sensitive to thermal shock than low-carbon CoCr-alloys and PM-HSS. A cast CoCr tool that is very warm should not be cooled too quickly—if it does it will break, so it is recommended to cool such tool in air, not with water or as stated "Never quench Tantung tools in water". This is also a result of the large and not well-dispersed chromium carbides.

These Co alloys with high carbon content all have a microstructure where the chromium carbides are very large and this normally results in a microstructure with low fracture toughness and fatigue strength. Five examples are shown in the figures mentioned below. In the images, black areas are different chromium carbides, the white areas are tungsten carbide formations and the grey areas are the cobalt-chromium matrices. The CoCr matrix also contains traces of W and C, increasing its strength.

FIGS. 6 to 11 disclose the microstructure of prior art alloys.

Development of a New Alloy Suitable for 3D-Printing

The surprisingly good properties of the new alloys of the present invention were mapped in this patent application by doing a large number of melting trials in combination with 3D-printing of an existing alloy. The goal was to use a Co-based composition with a fairly low melting point, with the main alloying elements Cr, W and a high C content, to achieve a high hardness and toughness, and a very fine microstructure. In addition, some other addition elements such as Mn, Ni, Nb, Si and Fe were also used in the trials. The compositions and results of the trials are presented in Table 1 in combination with some reference materials.

The melting trials were performed by mixing the elements of the desired alloys in powder form and melting them by induction. The laboratory furnace had a vacuum chamber with a pressure of 350 torr (about 460 mBar, 46 kPa) and was flushed with argon gas during pumping so that argon was present in the chamber during melting of the sample. The samples were then analyzed on polished cross sections with 2 kg Vickers hardness indentation according to SS-EN ISO 6507, crack length measurement by 250 kg Vickers indentation, and the microstructure was analyzed by light optical microscopy and scanning electron microscopy on polished samples. The crack length measurement was used only for initial mapping of toughness, crack initiation, of the investigated alloys since it is not a very good or accurate measurement of crack propagation. Instead, the microstructure was used as a quality measurement of the fatigue and thermal shock resistance.

The melt trial samples are also compared with two cemented carbides and a 3D-printed high carbon cobalt chromium alloy, since it is well known that cemented carbides have high hot hardness but are brittle and difficult to manufacture.

TABLE 1

Melting trials of Co-based alloys where the contents are in wt %. CC = cemented carbide reference samples from a commercial actor, Sandvik. The composition of alloy no. 1 is Stellite 190, no. 2 is Tantung G and no. 3 is Toolmetal. Alloys no. 4-24 are thermodynamically calculated compositions with melting points of about 1500° C., except for no. 21 with a melting point of 1600° C. No. 30 is a 3D-printed trial made with a MicroMelt 1 powder (from Carpenter). The CC11 is a tough cemented carbide multi-purpose grade, and CC25 is an extremely tough cemented carbide grade for cold forming tools.

| Melt trial alloy No | C wt % | Cr wt % | W wt % | Mn wt % | Ni wt % | Nb wt % | Si wt % | Fe wt % | Hard. [HV 2 kg] | Sum of crack leng. [μm] |
|---|---|---|---|---|---|---|---|---|---|---|
| 1 | 2.5 | 31 | 13 | 1 | 3 | | 1 | 2.5 | 640 | 80 |
| 2 | 3.3 | 27 | 17 | 1 | 3 | 3 | 1 | 2.5 | 920 | 880 |
| 3 | 2 | 33.5 | 18.5 | 1 | | | 1 | 2.5 | 910 | 560 |
| 4 | 3 | 15 | 15 | | | 3 | | | 650 | 400 |
| 5 | 3 | 15 | 15 | 1 | 3 | 3 | 1 | 2.5 | 520 | 320 |
| 6 | 3.9 | 20 | 21.5 | | | | | | 970 | 120 |
| 7 | 3.9 | 20 | 21.5 | 1 | 3 | | 1 | 2.5 | 920 | 340 |
| 8 | 3.3 | 27 | 23 | | | | | | 950 | 640 |
| 9 | 3.3 | 27 | 23 | 1 | 3 | | 1 | 2.5 | 915 | 880 |
| 10 | 3.3 | 15 | 24 | | | | | | 890 | 440 |
| 11 | 3.3 | 15 | 24 | 1 | 3 | | 1 | 2.5 | 840 | 320 |
| 12 | 2.7 | 12 | 30 | | | | | | 782 | 44 |
| 13 | 2.9 | 14 | 29 | | | | | | 859 | 47 |
| 14 | 3.1 | 16 | 28 | | | | | | 904 | 212 |
| 15 | 3 | 18 | 28 | | | | | | 862 | 199 |
| 16 | 3.1 | 19 | 27 | | | | | | 739 | 382 |
| 17 | 3.25 | 20 | 26 | | | | | | 978 | 206 |
| 18 | 3.5 | 22 | 24 | | | | | | 868 | 292 |
| 19 | 3.9 | 20 | 21.5 | | | | 1 | | 845 | 171 |
| 20 | 3.9 | 20 | 29 | | | | | | 1086 | 427 |
| 21 | 3.9 | 24 | 21.5 | | | | | | 833 | 330 |
| 22 | 3.56 | 18 | 24 | | | | | | 888 | 1014 |
| 23 | 3.7 | 19 | 23 | | | | | | 899 | 811 |
| 24 | 4.12 | 22 | 20 | | | | | | 837 | 168 |
| 25 | 3.95 | 20 | 21.5 | | | 1 | | | 1000 | 157 |
| 26 | 4.21 | 20 | 21.5 | | | 2.6 | | | 1018 | 376 |
| 27 | 4.25 | 18 | 25 | | | | | | 1020 | 309 |
| 28 | 4.5 | 27 | 16 | | | | | | 965 | 108 |
| 29* | 2.8 | 31.5 | 13.5 | 0.5 | 1.5 | | 1 | 1.5 | 733 | 14 |
| CC11 | | | 11% Co, 2 μm average WC grain size. | | | | | | 1546 | 908 |
| CC25 | | | 25% Co, 2-3 μm average WC grain size. | | | | | | 1124 | 49 |

*3D-printed high carbon Co-alloy with composition from specification

Figure 11A:
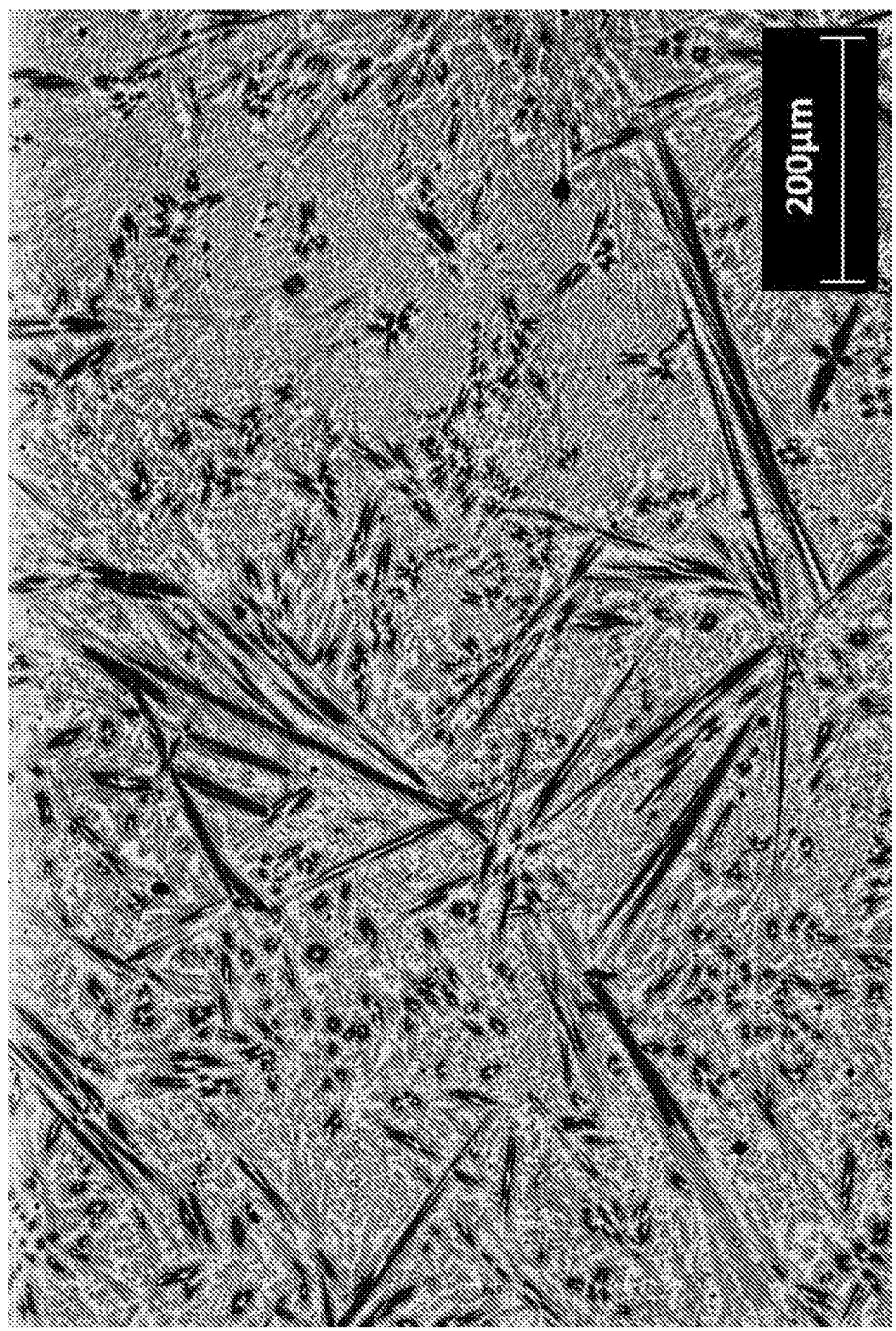
FIG. 11a, SEM Picture of microstructure of Tantung 144.
Figure 11B:
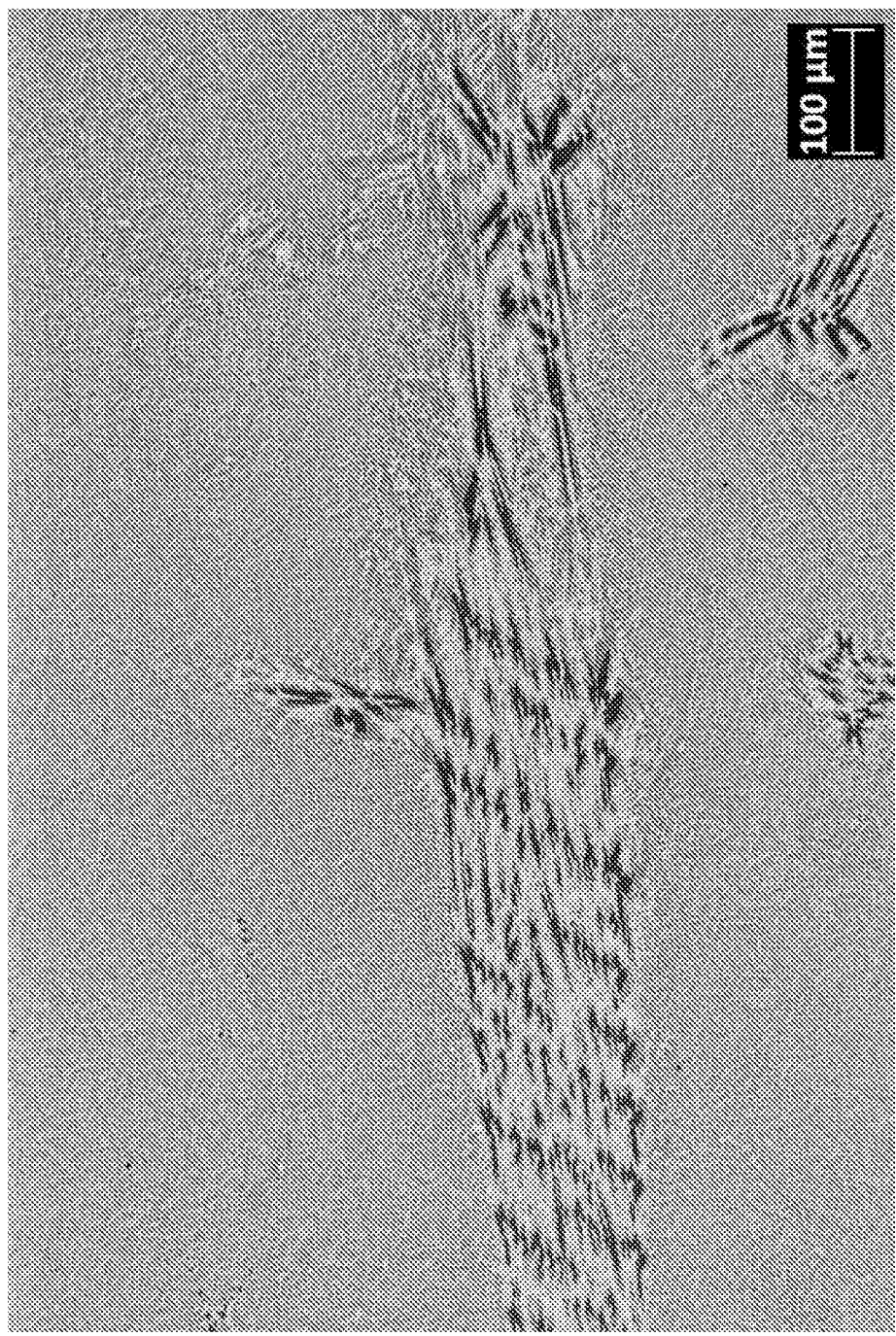
FIG. 11b, SEM Picture of microstructure of Stellite J.
Figure 12:
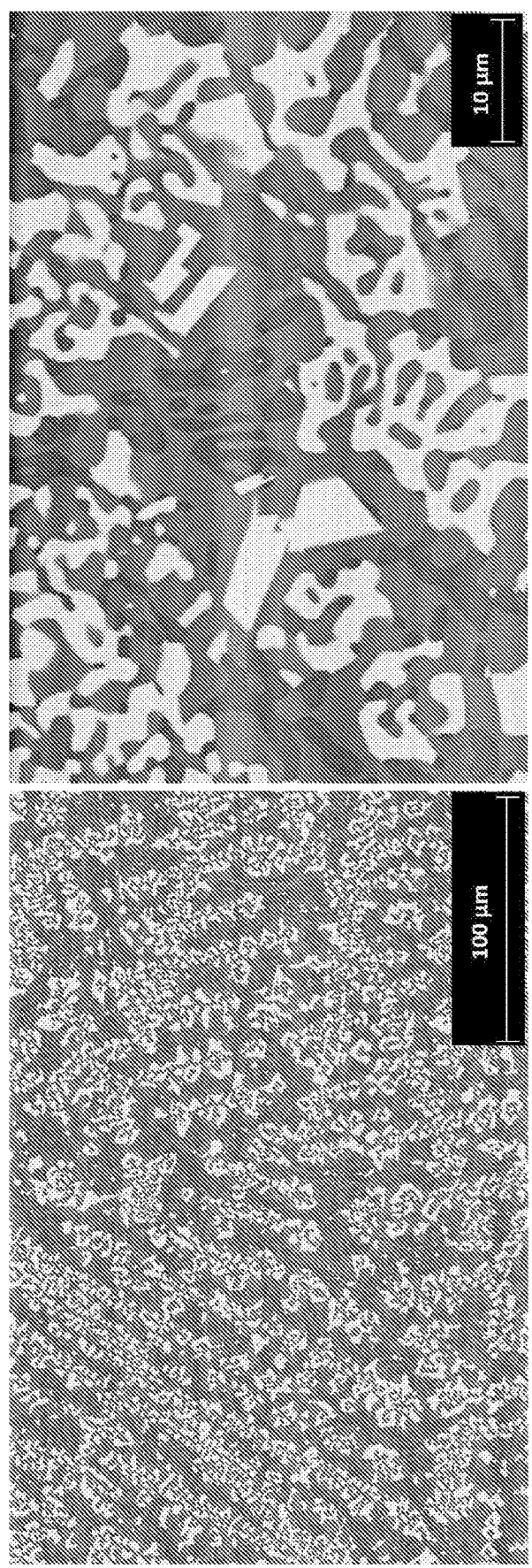
FIG. 12, Microstructure of melt trial alloy no. 13 according to the invention. Small primary WC carbides (white) and chromium carbides (dark grey) are surrounded by CoCr-matrix. This alloy composition has a surprisingly good combination of high hardness and high toughness at this low melting point (1500° C.). [SEM, mag. 1000× and 5000×].
Figure 13:
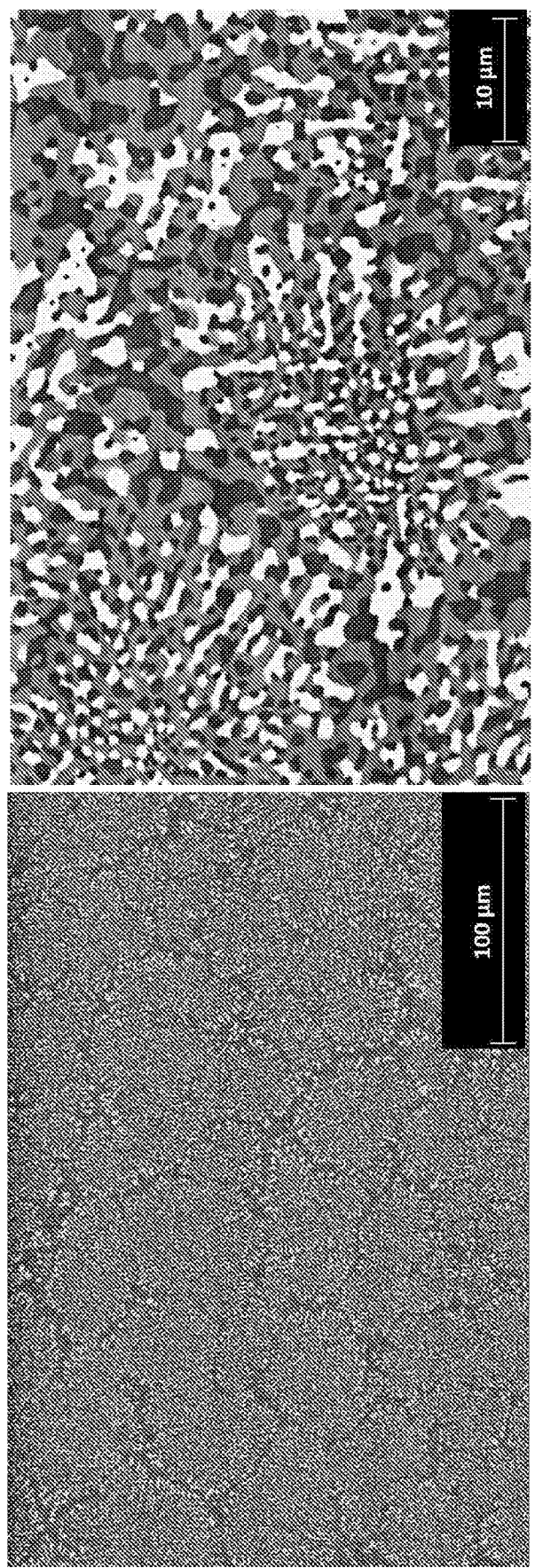
FIG. 13, Microstructure of melt trial alloy no. 17 according to the invention. Platelets of very fine W (white) and Cr (black) carbides surrounded by borders of only Cr-carbides in the CoCr matrix. The CoCr matrix is also seen inside the platelets. [SEM, mag. 1000× and 5000×]

The test matrix in Table 1 displays a number of interesting results. Some examples of the interesting microstructures are shown in FIG. 11-13. It needs to be pointed out that samples having a heterogeneous micro structure will exhibit different mechanical properties depending on where on the sample the test is performed. For example alloy no. 29 has many Chromium Carbide strings of 20-30 μm in some sections but no or few strings in other sections.

Alloy 3 in table 1 has a composition very similar to Rexalloy in FIG. 5. The measured crack length of the finished part of Rexalloy in FIG. 5 is 0 μm which is extremely low. The same alloys elaborated in the melt trial had a crack length of 560 μm (Table 1). This indicates that alloys with crack lengths around this value are susceptible to have a good toughness.

Figure 14:
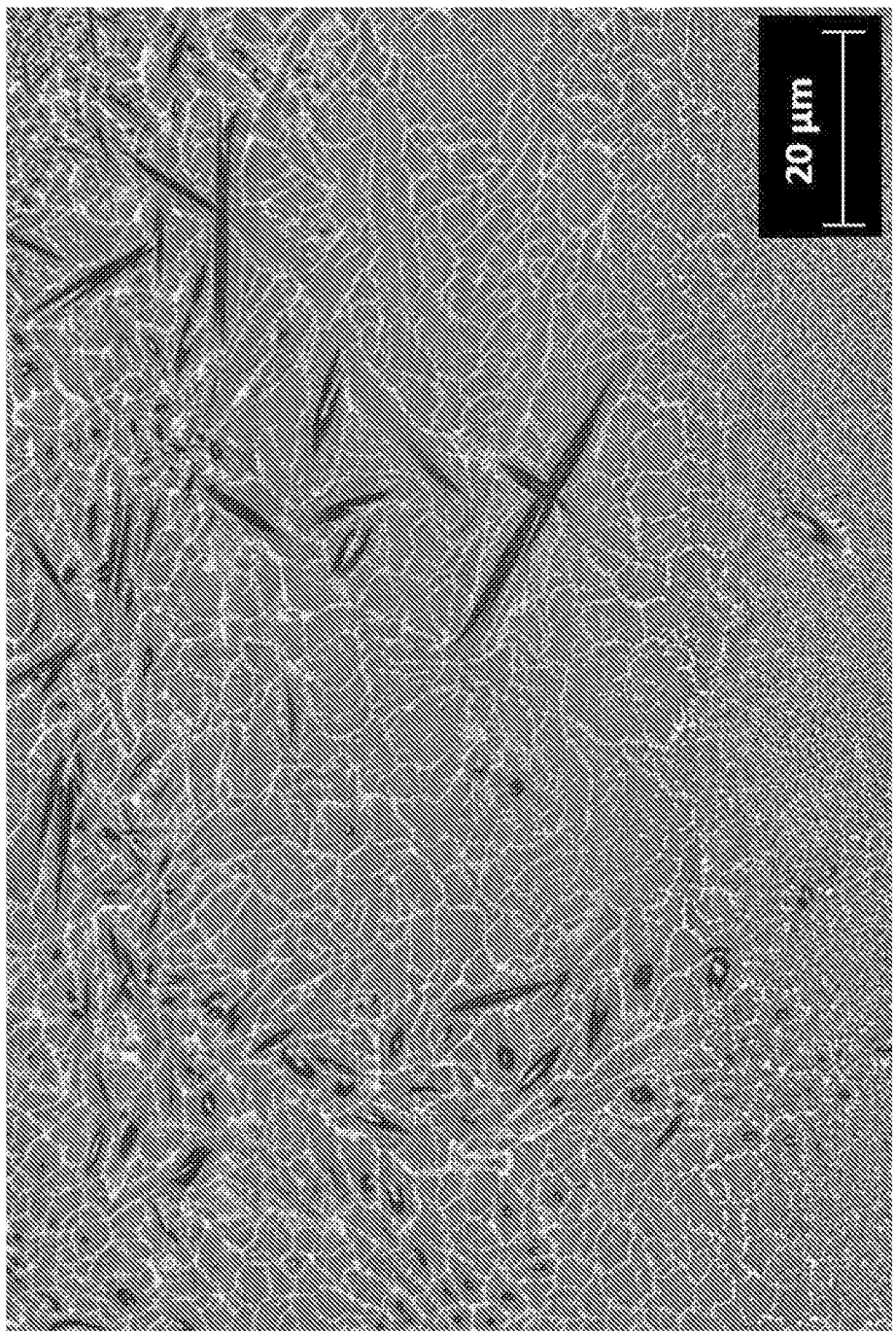
FIG. 14, Microstructure of 3D-printed alloy 29, a commercially available alloy. A very fine microstructure is generally seen, but the high Cr content (30%) results in a formation of large, around 30 μm, CrC-stringers/rods (black). [SEM, mag. 2310×].
Figure 15:
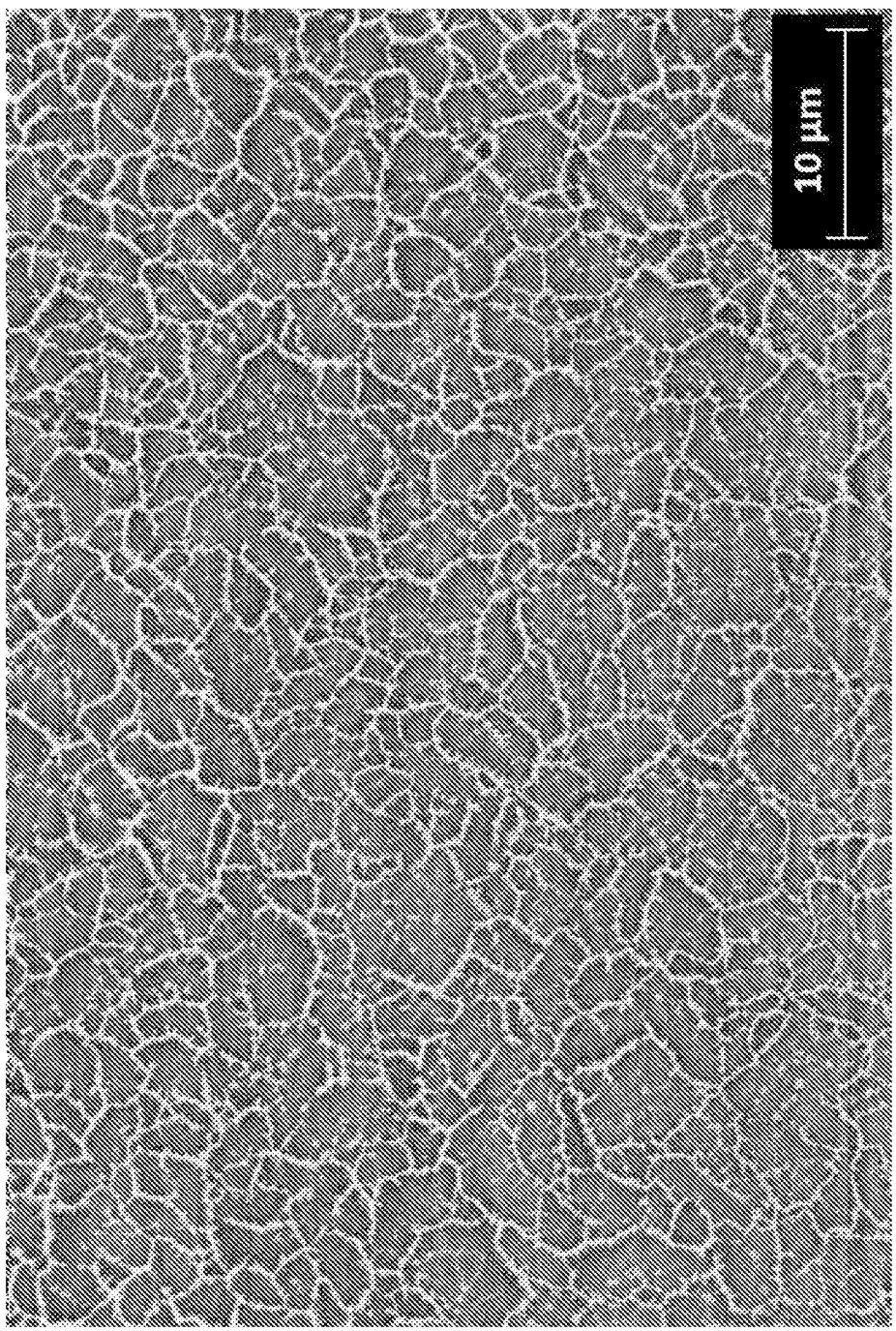
FIG. 15, Microstructure of 3D-printed alloy 29, commercially available alloy. Example achieved in the 3D-printing trial. A fine microstructure is seen and well distributed W-carbides forming a net. In this part of the alloy, the Cr-carbides are small and distributed in the CoCr-matrix. [SEM, mag. 5000×]
Figure 16:
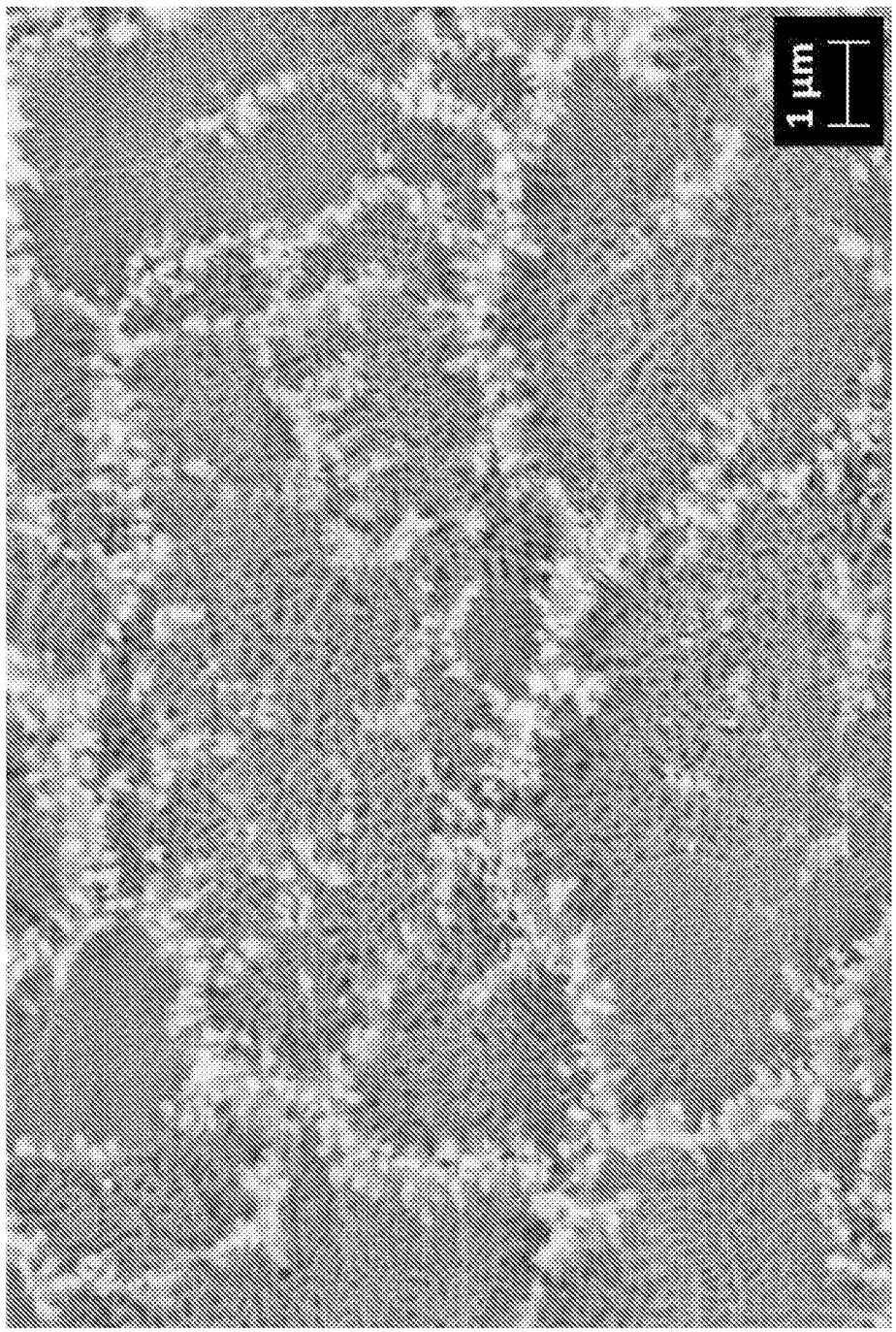
FIG. 16, Microstructure of 3D-printed alloy 29, commercially available alloy. Example achieved in the 3D-printing trial. The example show distributed Cr-carbides (black small stringers/rods) in the CoCr-matrix (grey) and the W-carbides forming a skeleton net. Please note that this "net" is not one large W-carbide, it is made up of many small (sub-micron) W-carbides formed in the grain boundaries. [SEM, mag. 20000×].

To understand the 3D-printing possibilities of CoCr-alloys, a 3D-printing was performed using an existing commercial powder, MicroMelt 1 (according to specification, nr 29 in Table 1). To be sure of the actual composition, the alloy was analyzed after the 3D-printing. In addition, the quite similar alloy composition for Stellite 190 was used in melt trial alloy nr 1. These three different compositions are presented in Table 2. The melt trial alloy nr 1 was prepared as described above and the nr 29 alloy was 3D-printed as described below. The result on microstructure on the melt trial nr 1 (FIG. 11) is much coarser than the one from the 3D printed material (FIG. 15). In the 3D-printed material of the present invention, for example as seen in alloy 29, chromium carbides stringers or rods with max sizes of 50 μm or more could however be found (FIG. 14). In the melt trials, for a similar material as used in the 3D trial, the max carbide size in the solidified material was 30 μm.

The 3D-printed Co-based alloy no. 29 in Table 1 was processed in an electron beam 3D-printing machine, an Arcam A2X, with a build plate start temperature of 920° C. The powder layer thickness was 100 μm and the vacuum chamber had an average pressure of about 0.003 mB (0.3 Pa) with standard He addition. The powder used had the specified composition and a powder size fraction of 45-125 μm. The continuous preheat of the metal powder bed is performed in two steps, PreHeat1 and PreHeat2, where the PreHeat1 is performed on the whole build plate area with a beam energy of 42 mA, repeated 10 times, and the PreHeat2 is performed on and nearby the intended following melting zone area with a beam energy 47 mA, repeated 6 times. This setting lead to a high build temperature during the whole build. The settings in the melting parameters are close to the standards at the time for existing Arcam CoCr alloy theme version 5.0.60 but adjusted to suit the actual test geometry according to standard recommendations from Arcam.

TABLE 2

Alloy compositions (specified and measured) in 3D-printing trial of an existing CoCr-powder (A and B). In comparison, the composition of the Stellite 190 alloy composition in the melt trial no 1 is also shown here (C). It can be seen that the MicroMelt 1 and the Stellite 190 has quite similar composition.

| | C wt % | Mn wt % | Cr wt % | Ni wt % | Nb wt % | W wt % | Si wt % | Ta wt % | Fe wt % | Co wt % | Mo wt % |
|---|---|---|---|---|---|---|---|---|---|---|---|
| A) 3D-printed powder composition according to specification (MicroMelt 1) | 2.8 | 0.5 | 31.5 | 1.5 | | 13.5 | 1 | | 1.5 | rest | 0.5 |
| B) 3D-printed material (measured composition, alloy no. 29) | 2.53 | 0.35 | 30.3 | 2.9 | 0.01 | 14.4 | 0.15 | 0.06 | 0.78 | rest | 0.14 |
| C) Stellite 190 (melt trial alloy nr 1) | 2.5 | 1 | 31 | 3 | | 13 | 1 | | 2.5 | rest | |

The result from the 3D-printing is very interesting, showing that it is possible to achieve an extremely fine microstructure in the manufactured alloy using the present method, see FIGS. 13 to 16. However, the high chromium content in this commercially available alloy (Micromelt 1) still results in long chromium carbide stringers or rods which jeopardize the mechanical properties of the product such as fracture toughness, thermo shock and fatigue resistance. These are material properties that all are dependent on a minimum of stress concentrations inside the bulk material.

Figure 17:
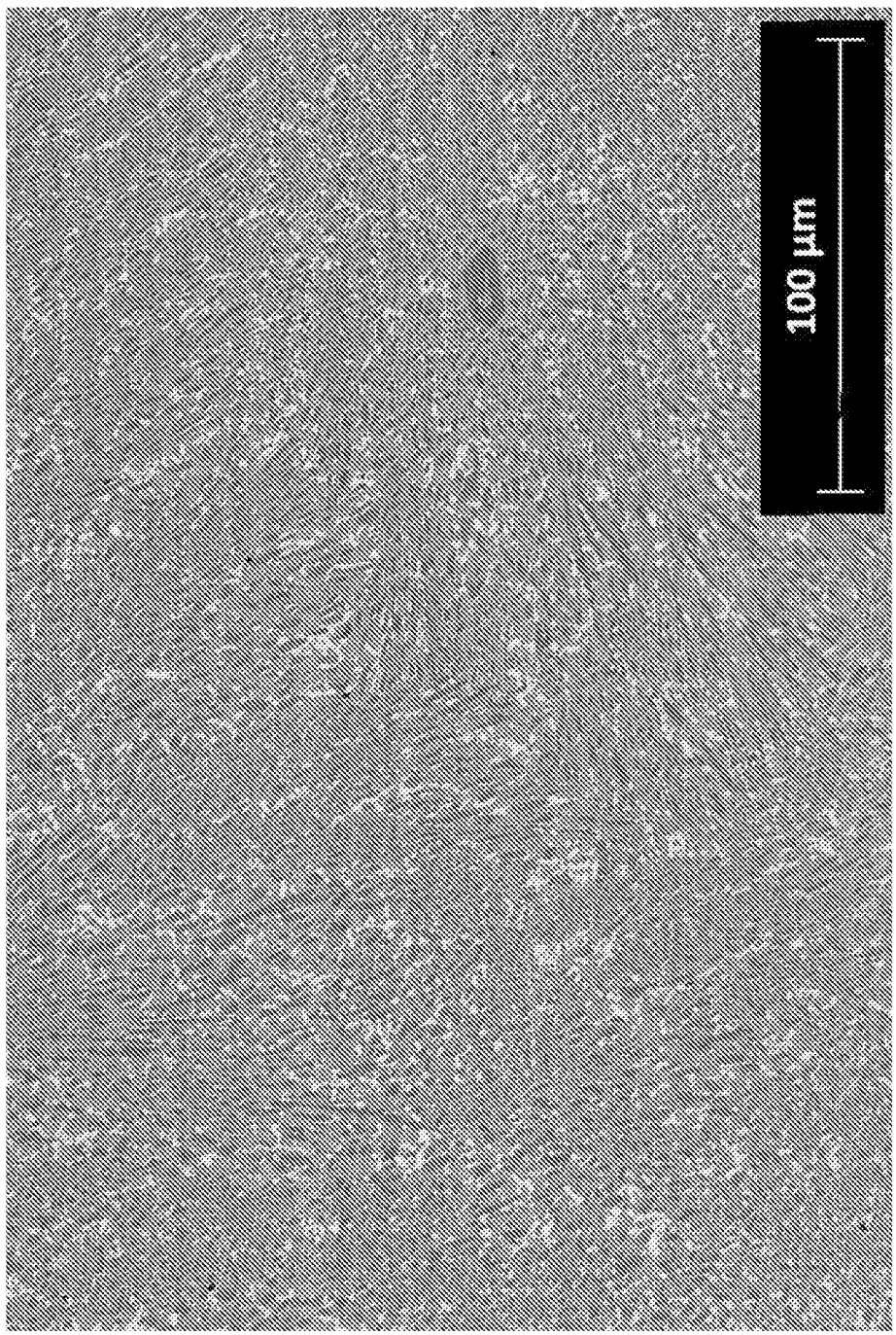
FIG. 17, Microstructure of melt trial alloy no. 1. This is a commercial available composition (Stellite 190). Small primary WC carbides (white) coupled to chromium carbides (black) in a cobalt chrome matrix (grey). The microstructure is partly fine, but the hardness is relatively low (640 HV). When comparing this microstructure with FIG. 15, it can be seen that the microstructure is much coarser than in the 3D-printing, this is especially obvious for the Cr carbides. [SEM, mag. 1000×]

To understand the similarities between the results of the melting trials and the 3D-printing method, a test alloy no. 1 of similar composition (C) is compared with the 3D-printing trial of the PTA powder (A and B). The microstructure achieved of this composition in the melt trials is shown in FIG. 17. It can be seen that the microstructure is a little coarser in test trial 1 than in the 3D-printing, this is especially obvious for the Cr carbides.

Based on the market analysis and the presented trials, we have shown the following:

- It seems beneficial to 3D-print high carbon cobalt-based alloys, as a surprisingly fine microstructure in combination with high hardness and high toughness can thereby be achieved. The formation of large Cr-carbide stringers is believed to be avoided or at least minimized.
- There is a limit in how much Cr it is beneficial to have in these types of alloys, and the limit is 27 wt %, preferably less than 24 weight %. Above this, large chromium carbides are formed, even in the 3D-printing, resulting in low toughness, low thermal shock resistance and low fatigue resistance. It is also well known that these types of Co alloys with high carbon content can withstand high temperatures, but that they are very brittle. There is therefore a need for a microstructure without the large chromium carbides stringers. By reducing the Cr content and instead increasing the C and W content in combination with the very rapid solidification achievable by the 3D printing, this feature can be achieved. It seems most preferable to keep the chromium content equal or lower than the tungsten content in weight % in order to limit the growth of chromium carbides in favor of tungsten carbides.
- As chromium gives corrosion resistance its level should not be reduced too much and since the chromium is a carbide former that will help to increase hardness and wear resistance.
- In addition, a higher Cr content also results in higher melting point which makes it very difficult to atomize a powder of these alloy types.
- It is beneficial to have a high W content, 20-30 wt %, in combination with a high C content (2.7-4.5) in these types of Co-based alloys for 3D-printing. The result is a hard, heat resistant Co alloy with well-dispersed carbides with surprisingly fine microstructure. These types of alloy are perfectly suited for applications such as metal cutting tools and similar. If the W or the C content are increased further, the melting point of such alloys will be too high for powder atomizing and 3D-printing.

Example 2

Two types of alloys were 3D printed according to the present method.

MicroMelt1 (MM1), existing PTA grade from Carpenter having the composition of:

| C | Cr | W | Ni | Mo | Fe | Si | Mn | Co |
|---|---|---|---|---|---|---|---|---|
| 2.8 | 31.5 | 13.5 | 1.5 | 0.5 | 1.5 | 1.0 | 0.5 | rest |

Composition of an alloy according to the present invention with the composition of:

| C | Cr | W | Ni | Mo | Fe | Si | Mn | Co |
|---|---|---|---|---|---|---|---|---|
| 3.95 | 20.6 | 21.2 | | | | 0.7 | | rest |

The samples were tested and analyzed regarding hardness and micro structure.

On the Micro Melt 1-alloy after 3D-printing, the hardness was measured to 835 HV2 kg, which is about 65 HRC. In the specification from Carpenter*, a typical deposited hardness of the same alloy is 50-52 HRC.

*=Plasma Transferred Arc (PTA) and Laser Overlay powder specification, Carpenter Powder Products, 07-12 1K T35E.

Figure 20:
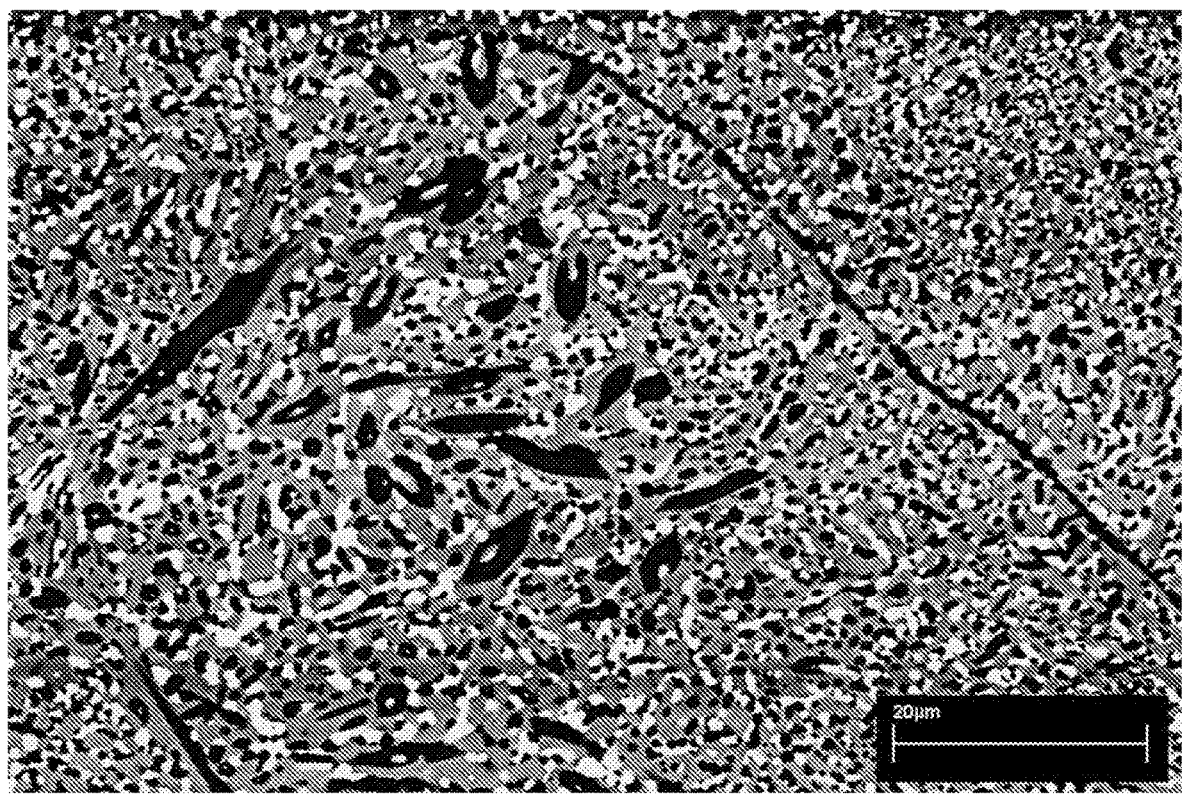
FIG. 20 SEM picture. Typical microstructure of MicroMelt 1 after 3D-printing. The black sharp stringers are Cr-carbides resulting in decreased toughness in the material. The max length of this carbide type in this image is 22 μm, but it is also possible to see the extremely long black stringer in the image. [1 μm Diamond Polished Sample in 5 min, image from QBSD FEG-SEM].
Figure 21:
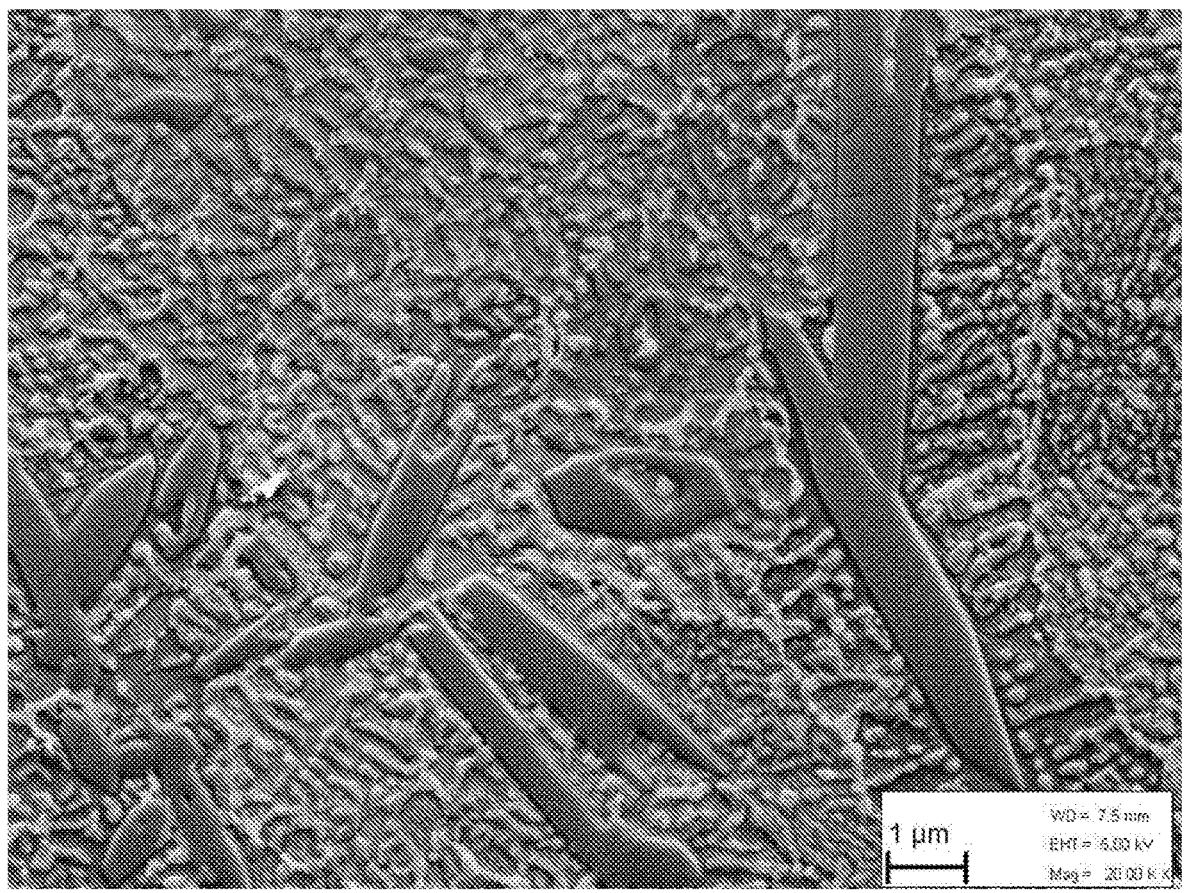
FIG. 21 SEM picture. Microstructure of MicroMelt 1 after 3D-printing. The black sharp stringers (about max 10 μm long) are Cr-carbides resulting in decreased toughness in the material.

However, in the Micro Melt 1-alloy after 3D-printing, the microstructure still has a problem with Cr-carbides, forming longer sharp stringers/rods, which is locally increasing the stresses and therefore reducing the toughness in the materials. See FIGS. 20 and 21.

Instead in the 3D printed product according to the present invention, the microstructure of the material is much finer thanks to the lower Cr content, higher W and C content and the present method, see FIGS. 22, 23 and 24.

The hardness of the new alloy according to the present invention has also been measured. In one sample, it was 873 HV2 kg after HIP and in another sample it was 871 HV2 kg, measured in the same ways as described earlier in the application (5 separate indents on diamond polished surface).

To calculate the carbide volume, the carbides seen in FIG. 23 were marked (see FIG. 24) and the area fraction was calculated. The cross-section area was translated to volume and the total carbide fraction of the sample in FIG. 23 was therefore 60.7 vol % with an average carbide area of 0.87 µm². If assuming all carbide cross sections are circular, the average carbide diameter is 1.06 µm.

|  | Covered cross section area [%] | Average carbide area [µm²] |
|---|---|---|
| W-rich carbides (white) | 17.3 | 0.5 |
| Cr-rich carbides (grey) | 43.4 | 1.23 |
| Total | 60.7 | — |
|  | Average area all carbides | 0.87 |

To be sure on the carbide content of the present alloy, an additional calculation was done based on FIG. 25, which is another sample than the ones seen in FIG. 22-24. In FIGS. 26 and 27 the edges of the tungsten (W) rich and the chromium (Cr) rich carbides have been marked. To calculate the carbide volume, the carbides seen in FIG. 25 were numerated and the cross section area was calculated, see FIGS. 26 and 27. The cross-section area was then translated into volume and the carbide fraction in the sample seen in FIG. 25 was 67.8 vol % with an average carbide area of 1.2 µm².

|  | Covered cross section area [%] | Average area [µm²] |
|---|---|---|
| W-rich carbides (white) | 19.4 | 1.46 |
| Cr-rich carbides (grey) | 48.4 | 0.95 |
| Total | 67.8 |  |
| Average |  | 1.2 |

As seen above the total carbide content lies between 60.7 vol % and 67.7 vol %. A calculated average carbide diameter (of assumed circular shaped) carbides is 1.06 µm. The largest carbide seen was around 2.5 µm from edge to edge.

Example 3

The 3D printed product obtained in Example 2 with an alloy according to the present invention was tested in a long term heating test where the product was heated during an extended period of time and then the mechanical properties were tested.

The test was done by placing the product in an oven at 650° C. for 168 h, i.e. 7 whole days. This corresponds to a use time for a cutting tool of 75 seconds per gear when producing 800 gears, i.e. 6000 seconds (16.67 h). If the cutting tool is resharped ten times it will be 166.7 h.

The hardness of the product was 870 HV2 kg (around 66HRC) after HIP. After the long term heating test it was 866 HV2 Kg (around 66HRC). In other words, the hardness of the material is maintained even after long term use.

The same was seen for the melt trial alloy 6. After HIP it was 900 HV2 kg (around 67HRC) and after the long term heating test it was 870 HV2 kg (around 66HRC).

The invention claimed is:

1. A 3D-printed product made of an alloy comprising a metal matrix and grains of carbides embedded in the metal matrix;
   wherein the alloy comprises
   Carbon: equal to or greater than 3.1 and equal to or less than 5.1 weight %,
   Tungsten: equal to or greater than 18 and equal to or less than 30 weight %,
   Chromium: equal to or greater than 15 and equal to or less than 24 weight %
   Cobalt: equal to or greater than 40 weight %;
   wherein the sum of the chromium and tungsten is 36 to 48 wt %;
   wherein the alloy has a melting point of less than 1750° C., but higher than 1300° C.; and
   wherein the alloy does not comprise carbides larger than 10 µm.

2. The product according to claim 1 wherein the sum of tungsten and chromium content is equal to or lower than 46 weight %.

3. The product according to claim 1 wherein the alloy further comprises 1 to 3 weight % of at least one of niobium, nickel, manganese, silicon and iron.

4. The product according to claim 1 wherein the cobalt content is equal to or greater than 50 weight %.

5. The product according to claim 1 wherein the alloys comprises
   Carbon: equal to or greater than 3.3 and equal to or less than 4.2 weight %,
   Tungsten: equal to or greater than 19 and equal to or less than 25 weight %,
   Chromium: equal to or greater than 18 and equal to or less than 23 weight %
   Cobalt: at least 45 weight %;
   wherein the sum of the chromium and tungsten is 39 to 45 wt %.

6. The product according to claim 1 wherein the alloys comprises
   Carbon: equal to or greater than 3.5 and equal to or less than 4.1 weight %,
   Tungsten: equal to or greater than 20 and equal to or less than 24 weight %,
   Chromium: equal to or greater than 19 and equal to or less than 22 weight %
   Cobalt: at least 40 weight %; and
   wherein the sum of the chromium and tungsten is 41 to 44 wt %.

7. The product according to claim 1 wherein the combined content of carbon, tungsten, chromium and cobalt is equal to or greater than 98 weight %.

8. The product according to claim 1 wherein the product has a hardness of at least 800 HV2 kg.

9. The product according to claim 1 wherein the melting is less than 1750° C. and higher than 1400° C.

10. The product according to claim 1 wherein the product has a cavity or a curved channel.

11. The product according to claim 10 wherein the cavity is sealed or has an opening wherein the diameter of the opening is less than the diameter or width of the cavity.

12. The product according to claim 1 wherein the total combined content of carbon, tungsten, chromium and cobalt is equal to or greater than 98 weight % of the total content of the alloy.

13. The product according to claim 1 wherein the alloy has a carbide content of at least 60 vol %.

14. The product according to claim 1 wherein the product is a cutter, a milling cutter, a power skiving cutter or a drill.

15. A method of preparing the 3D printed product according to claim 1 in a free forming apparatus having a chamber comprising:
   a. forming a layer of a powder of a cobalt based alloy in an oxygen-low environment in the chamber wherein the alloy comprises:
      Carbon: equal to or greater than 3.1 and equal to or less than 5.1 weight %,
      Tungsten: equal to or greater than 18 and equal to or less than 30 weight %,
      Chromium: equal to or greater than 15 and equal to or less than 24 weight %
      Cobalt: equal to or greater than 40 weight %;
      wherein the sum of the chromium and tungsten is 36 to 48 wt %; and
      wherein the alloy has a melting point of less than 1750° C. but higher than 1300° C.;
      wherein the powder comprises substantially spherical particles and/or substantially spherical particles with satellites and wherein the particles have a mean size of below 200 μm;
   b. heating the powder layer to a temperature higher than 600° C.;
   c. melting the powder locally by exposing the powder to an energy beam during a sufficient period of time to form a melt pool; and
   d. letting the melted powder in the melt pool solidify into a multiphase cobalt alloy;
   e. optionally preparing an additional layer of powder on top of the previous layer by repeating the steps a-e wherein step b comprises placing the powder on top of the previous layer;
   and wherein the product being built is kept heated above 600° C. during the method.

16. The method according to claim 15 wherein the melting of the powder locally generates a melt pool wherein the diameter of the melt pool is equal to or less than 2 mm.

17. The method according to claim 15 wherein the mean particle size is 100 to below 200 μm.

18. The method according to claim 15 wherein the energy beam is an electron beam.

19. The method according to claim 15 wherein the method further comprises a step f of comprising heat treating the obtained multiphase cobalt alloy.

20. The method according to claim 15 wherein the whole or a part of the product being built is kept heated above 700° C. during the method.

21. The method according to claim 15 wherein the powder is preheated prior to the melting of the powder in order to sinter the added powder layer to the underlying previous layer.

* * * * *